US010182086B2

(12) United States Patent
Xiong et al.

(10) Patent No.: US 10,182,086 B2
(45) Date of Patent: Jan. 15, 2019

(54) METHOD AND APPARATUS FOR TRANSMITTING STREAMING MEDIA DATA

(71) Applicant: HUAWEI TECHNOLOGIES CO., LTD., Shenzhen (CN)

(72) Inventors: Chunshan Xiong, Beijing (CN); Lixue Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 630 days.

(21) Appl. No.: 14/817,599

(22) Filed: Aug. 4, 2015

(65) Prior Publication Data
US 2015/0341404 A1  Nov. 26, 2015

Related U.S. Application Data

(63) Continuation of application No. PCT/CN2013/071349, filed on Feb. 4, 2013.

(51) Int. Cl.
*G06F 15/16* (2006.01)
*H04L 29/06* (2006.01)
*H04L 29/08* (2006.01)

(52) U.S. Cl.
CPC ........ *H04L 65/4069* (2013.01); *H04L 65/103* (2013.01); *H04L 65/4084* (2013.01);
(Continued)

(58) Field of Classification Search
CPC .... H04L 65/4069; H04L 65/601; H04L 67/02
(Continued)

(56) References Cited

U.S. PATENT DOCUMENTS 8,068,440 B2   11/2011  Stanwood et al.
9,026,671 B2 *  5/2015  Gillies ................ H04L 12/1881
                                              370/230
(Continued)

FOREIGN PATENT DOCUMENTS

CN   102694823   9/2012
CN   102740159   10/2012
(Continued)

OTHER PUBLICATIONS

Rainer et al., "A Seamless Web Integration of Adaptive HTTP Streaming", Aug. 27, 2012, 20th European Signal Processing Conference, 1519-1523.*
(Continued)

*Primary Examiner* — Anthony Mejia
(74) *Attorney, Agent, or Firm* — Staas & Halsey LLP

(57) ABSTRACT

The present invention discloses a method and an apparatus for transmitting streaming media data and relates to the field of multimedia communication technologies. The method includes: receiving a data request sent by a user equipment UE, where the data request is used to request a media presentation description MPD file from a streaming media server; if the UE does not support a dynamic adaptive steaming over the Hypertext Transfer Protocol HTTP DASH technology, forwarding the data request to the streaming media server, and receiving the requested MPD file that is delivered by the streaming media server according to the data request; and acquiring DASH streaming media data from the streaming media server according to the MPD file, and sending the DASH streaming media data to the UE, where a rate at which the DASH streaming media data is transmitted matches a bit rate selected from the MPD file.

18 Claims, 12 Drawing Sheets

(52) U.S. Cl.
CPC .......... *H04L 65/601* (2013.01); *H04L 65/605* (2013.01); *H04L 65/80* (2013.01); *H04L 67/02* (2013.01)

(58) Field of Classification Search
USPC ........................................................ 709/231
See application file for complete search history.

(56) References Cited

U.S. PATENT DOCUMENTS

| | | | |
|---|---|---|---|
| 9,357,272 B2* | 5/2016 | Oyman | H04N 21/6131 |
| 9,544,628 B2* | 1/2017 | Mack | H04L 65/605 |
| 9,736,651 B2* | 8/2017 | Chen | H04W 4/028 |
| 2012/0254456 A1 | 10/2012 | Visharam et al. | |
| 2013/0117413 A1 | 5/2013 | Kaneko et al. | |
| 2013/0275615 A1* | 10/2013 | Oyman | H04L 65/60 709/231 |
| 2014/0040496 A1* | 2/2014 | Moorthy | H04L 65/4084 709/231 |
| 2014/0040959 A1* | 2/2014 | Oyman | H04N 21/6131 725/62 |
| 2014/0150044 A1 | 5/2014 | Takahashi et al. | |
| 2014/0317234 A1* | 10/2014 | Mueller | H04L 47/10 709/217 |
| 2014/0365556 A1* | 12/2014 | Rehan | H04L 65/60 709/203 |
| 2014/0372569 A1* | 12/2014 | Bouazizi | H04L 67/02 709/219 |
| 2015/0121484 A1* | 4/2015 | Liu | G06F 17/30887 726/5 |
| 2015/0172344 A1* | 6/2015 | Bae | H04L 65/4084 709/219 |

FOREIGN PATENT DOCUMENTS

| | | |
|---|---|---|
| JP | 2013-21574 | 1/2013 |
| KR | 10-2012-0139514 | 12/2012 |
| WO | WO2012/011450 A1 | 1/2012 |
| WO | 2012/099400 A2 | 7/2012 |
| WO | 2012/134530 A1 | 10/2012 |
| WO | 2013/003793 A1 | 1/2013 |

OTHER PUBLICATIONS

PCT International Search Report dated Nov. 7, 2013 in corresponding International Patent Application No. PCT/CN2013/071349.
Extended European Search Report dated Nov. 18, 2015 in corresponding European Patent Application No. 13873522.0.
Korean Notice of Allowance dated Apr. 12, 2016 in corresponding Korean Patent Application No. 10-2015-7023565.
Japanese Office Action dated Jan. 5, 2016 in corresponding Japanese Patent Application No. 2015-555526.
International Search Report dated Nov. 7, 2013, in corresponding International Application No. PCT/CN2013/071349.

* cited by examiner

METHOD AND APPARATUS FOR TRANSMITTING STREAMING MEDIA DATA

CROSS-REFERENCE TO RELATED APPLICATIONS

This application is a continuation of International Application No. PCT/CN2013/071349, filed on Feb. 4, 2013, which is hereby incorporated by reference in its entirety.

TECHNICAL FIELD

The present invention relates to the field of multimedia communication technologies, and in particular, to a method and an apparatus for transmitting streaming media data.

BACKGROUND

With the development of a third-generation mobile communication system (3G) and a fourth-generation mobile communication system (4G), a user equipment (UE), such as a mobile phone or a tablet computer, can receive and decode a video or audio stream in real time. However, compared with a traditional wired communication network, a channel in wireless communication sharply changes in real time, which causes a fluctuation in real-time streaming media transmission and further affects video viewing quality or audio listening quality of a user.

To adapt to a streaming media transmission mechanism in a mobile communication environment, the prior art provides a Dynamic Adaptive Steaming over HTTP (DASH) technology, thereby ensuring fluency of a UE in receiving streaming media. The DASH technology is a streaming media transmission technology over HTTP and can effectively adapt to a change of a radio channel. It is ensured that even in a poor radio channel environment, a mobile terminal is provided with continuous and uninterrupted streaming media access experience by constantly switching between multiple bit rate versions of same content, that is, selecting a different segment from a representation corresponding to a different channel condition.

In a process of implementing the foregoing data transmission, because a UE that supports the DASH technology and a streaming media server that supports the DASH technology need to jointly participate in a DASH data transmission process, if the UE cannot support the DASH technology, a representation that matches a current channel condition and a segment in the representation cannot be selected according to an MPD file, which causes a playback failure; and if the streaming media server cannot support the DASH technology or the streaming media server does not store a DASH streaming media file corresponding to the DASH technology, the streaming media server sends a streaming media file to the UE when receiving a streaming media file request sent by the UE and then cannot provide the UE with streaming media data whose bit rate matches the current channel condition of the UE, and a problem of streaming media playback interruption occurs when the channel condition is poor. Therefore, there is a lack of a technical solution that can implement DASH communication when the UE or the streaming media server cannot support the DASH technology.

SUMMARY

A method and an apparatus for transmitting streaming media data according to the present invention are capable of solving a problem that a DASH technology cannot be implemented when at least one of a UE and a streaming media server does not support the DASH technology.

In a first aspect, the present invention provides a method for transmitting streaming media data, including:

receiving a data request sent by a user equipment UE, where the data request is used to request a media presentation description MPD file from a streaming media server;

if the UE does not support a dynamic adaptive steaming over the Hypertext Transfer Protocol HTTP DASH technology, forwarding the data request to the streaming media server, and receiving the requested MPD file that is delivered by the streaming media server according to the data request; and acquiring DASH streaming media data from the streaming media server according to the MPD file, and sending the DASH streaming media data to the UE, where a rate at which the DASH streaming media data is transmitted matches a bit rate selected from the MPD file.

In a first possible implementation of the first aspect, the method further includes:

determining, according to the data request, whether the UE supports the DASH technology.

In the first aspect or the first possible implementation of the first aspect, a second possible implementation of the first aspect is further provided, where in the second possible implementation of the first aspect, the determining whether the UE supports the DASH technology over HTTP includes:

acquiring DASH capability information of the UE from a mobility management control entity when a bearer is established or modified, and learning, according to the DASH capability information, whether the UE supports the DASH technology over HTTP; or acquiring DASH capability information of the UE from the data request, and learning, according to the DASH capability information, whether the UE supports the DASH technology over HTTP.

In the first aspect or the first possible or second possible implementation of the first aspect, a third possible implementation of the first aspect is further provided, where in the third possible implementation of the first aspect, the acquiring DASH streaming media data from the streaming media server according to the MPD file, and sending the DASH streaming media data to the UE, where a rate at which the DASH streaming media data is transmitted matches a bit rate selected from the MPD file includes:

searching for, in the MPD file, a bit rate representation that matches the rate at which the DASH streaming media data is transmitted;

determining the DASH streaming media data according to the found bit rate representation;

sending a DASH streaming media data request corresponding to the DASH streaming media data to the streaming media server;

receiving the DASH streaming media data that is sent by the streaming media server according to the DASH streaming media data request; and sending the DASH streaming media data to the UE.

In the first aspect or the first possible, second possible, or third possible implementation of the first aspect, a fourth possible implementation of the first aspect is further provided, where in the fourth possible implementation of the first aspect, after the sending the DASH streaming media data to the UE, the method further includes:

storing the MPD file and the DASH streaming media data;

when a same data request is received, searching for, according to the MPD file, the bit rate representation that matches the rate at which the DASH streaming media data is transmitted;

determining the DASH streaming media data according to the found bit rate representation; and sending the DASH streaming media data to the UE.

In a second aspect, the present invention further provides a method for transmitting streaming media data, including:

receiving a data request sent by a user equipment UE, where the data request is used to request streaming media data from a streaming media server;

sending the data request to the streaming media server if the streaming media server does not support a dynamic adaptive steaming over the Hypertext Transfer Protocol HTTP DASH technology;

receiving the requested streaming media data sent by the streaming media server;

converting the streaming media data into DASH streaming media data, and generating a media presentation description MPD file; and sending the MPD file to the UE, so that the UE acquires the DASH streaming media data according to the MPD file, where a bit rate of the DASH streaming media data matches a rate at which the DASH streaming media data is transmitted; or selecting, according to the MPD file, DASH streaming media data corresponding to the UE from the DASH streaming media data, and sending the DASH streaming media data to the UE, where the rate at which the DASH streaming media data is transmitted matches a bit rate selected from the MPD file.

In a first possible implementation of the second aspect, the method includes:

determining, according to the data request, whether the streaming media server supports the DASH technology over HTTP.

In the second aspect or the first possible implementation of the second aspect, a second possible implementation of the second aspect is further provided, where in the second possible implementation of the second aspect, the determining whether the streaming media server supports the DASH technology over HTTP includes:

acquiring DASH capability information of the streaming media server, and learning, according to the DASH capability information, whether the streaming media server supports the DASH technology over HTTP.

In the second aspect or the first possible or second possible implementation of the second aspect, a third possible implementation of the second aspect is further provided, where in the third possible implementation of the second aspect, the selecting, according to the MPD file, DASH streaming media data corresponding to the UE from the DASH streaming media data, and sending the DASH streaming media data to the UE, where the rate at which the DASH streaming media data is transmitted matches a bit rate selected from the MPD file includes:

searching for, in the MPD file, a bit rate representation that matches the rate at which the DASH streaming media data is transmitted;

determining, according to the found bit rate representation, the DASH streaming media data corresponding to the UE; and sending the DASH streaming media data to the UE.

In the second aspect or the first possible, second possible, or third possible implementation of the second aspect, a fourth possible implementation of the second aspect is further provided, where in the fourth possible implementation of the second aspect, after the sending the DASH streaming media data to the UE, the method further includes:

storing the MPD file and the DASH streaming media data;

determining, according to the found bit rate representation, the DASH streaming media data corresponding to the UE; and sending the DASH streaming media data to the UE.

In the second aspect or the first possible, second possible, third possible, or fourth possible implementation of the second aspect, a fifth possible implementation of the second aspect is further provided, where in the fifth possible implementation of the second aspect, after the sending the MPD file to the UE, the method further includes:

when a same data request is received, sending the MPD file to the UE, determining, according to a received DASH streaming media data request indication that matches a current channel condition of the UE, the DASH streaming media data corresponding to the UE, and sending the DASH streaming media data to the UE.

In a third aspect, the present invention further provides an electronic device, including:

a receiving unit, configured to receive a data request sent by a user equipment UE, where the data request is used to request a media presentation description MPD file from a streaming media server;

a sending unit, configured to forward, when the UE does not support a dynamic adaptive steaming over the Hypertext Transfer Protocol HTTP DASH technology, the data request received by the receiving unit to the streaming media server; where the receiving unit is configured to receive the requested MPD file that is delivered by the streaming media server according to the data request sent by the sending unit; and a processing unit, configured to acquire DASH streaming media data from the streaming media server according to the MPD file received by the receiving unit, where a rate at which the DASH streaming media data is transmitted matches a bit rate selected from the MPD file, and the sending unit is configured to send the DASH streaming media data acquired by the processing unit to the UE.

In a first possible implementation of the third aspect, the electronic device further includes:

a judging unit, configured to determine, according to the data request received by the receiving unit, whether the UE supports the DASH technology over HTTP.

In the third aspect or the first possible implementation of the third aspect, a second possible implementation of the third aspect is further provided, where in the second possible implementation of the third aspect, the judging unit includes:

a first acquiring subunit, configured to acquire DASH capability information of the UE from a mobility management control entity when a bearer is established or modified, and learn, according to the DASH capability information, whether the UE supports the DASH technology over HTTP; or configured to acquire DASH capability information of the UE from the data request, and learn, according to the DASH capability information, whether the UE supports the DASH technology over HTTP.

In the third aspect or the first possible or second possible implementation of the third aspect, a third possible implementation of the third aspect is further provided, where in the third possible implementation of the third aspect, the processing unit includes:

a searching subunit, configured to search for, in the MPD file, a bit rate representation that matches the rate at which the DASH streaming media data is transmitted; and a determining subunit, configured to determine the DASH streaming media data according to the bit rate representation found by the searching subunit; where:

the sending unit is further configured to send a DASH streaming media data request corresponding to the DASH streaming media data determined by the determining subunit to the streaming media server;

the receiving unit is further configured to receive the DASH streaming media data that is sent by the streaming media server according to the DASH streaming media data request sent by the sending unit; and the sending unit is further configured to send the DASH streaming media data received by the receiving unit to the UE.

In the third aspect or the first possible, second possible, or third possible implementation of the third aspect, a fourth possible implementation of the third aspect is further provided, where in the fourth possible implementation of the third aspect, the electronic device further includes:

a storage unit, configured to store the MPD file received by the receiving unit and the DASH streaming media data acquired by the processing unit; where:

the searching subunit is further configured to, when a same data request is received, search for, according to the MPD file stored by the storage unit, the bit rate representation that matches the rate at which the DASH streaming media data is transmitted;

the determining subunit is further configured to determine the DASH streaming media data according to the bit rate representation found by the searching subunit; and the sending unit is further configured to send the DASH streaming media data determined by the determining subunit to the UE.

In a fourth aspect, the present invention further provides an electronic device, including:

a receiving unit, configured to receive a data request sent by a user equipment UE, where the data request is used to request streaming media data from a streaming media server;

a sending unit, configured to send the data request to the streaming media server when the streaming media server does not support a dynamic adaptive steaming over the Hypertext Transfer Protocol HTTP DASH technology; where the receiving unit is configured to receive, after the sending unit sends the data request, the requested streaming media data sent by the streaming media server; and a first processing unit, configured to convert the streaming media data received by the receiving unit into DASH streaming media data and generate a media presentation description MPD file; where the sending unit is configured to send the MPD file generated by the first processing unit to the UE, so that the UE acquires the DASH streaming media data according to the MPD file, where a bit rate of the DASH streaming media data matches a rate at which the DASH streaming media data is transmitted; or a second processing unit, configured to select, according to the MPD file generated by the first processing unit, DASH streaming media data corresponding to the UE from the DASH streaming media data, where the rate at which the DASH streaming media data is transmitted matches a bit rate selected from the MPD file, and the sending unit is configured to send the DASH streaming media data that is corresponding to the UE and selected by the second processing unit to the UE.

In a first possible implementation of the fourth aspect, the electronic device further includes:

a judging unit, configured to determine, according to the data request received by the receiving unit, whether the streaming media server supports the DASH technology over HTTP.

In the fourth aspect or the first possible implementation of the fourth aspect, a second possible implementation of the fourth aspect is further provided, where in the second possible implementation of the fourth aspect, the judging unit is specifically configured to:

acquire DASH capability information of the streaming media server, and learn, according to the DASH capability information, whether the streaming media server supports the DASH technology over HTTP.

In the fourth aspect or the first possible or second possible implementation of the fourth aspect, a third possible implementation of the fourth aspect is further provided, where in the third possible implementation of the fourth aspect, the second processing unit includes:

a searching subunit, configured to search for, in the MPD file generated by the first processing unit, a bit rate representation that matches the rate at which the DASH streaming media data converted by the first processing unit is transmitted; and a determining subunit, configured to determine, according to the bit rate representation found by the searching subunit, the DASH streaming media data corresponding to the UE; and the sending unit is further configured to send the DASH streaming media data determined by the determining subunit to the UE.

In the fourth aspect or the first possible, second possible, or third possible implementation of the fourth aspect, a fourth possible implementation of the fourth aspect is further provided, where in the fourth possible implementation of the fourth aspect, the electronic device further includes:

a storage unit, configured to store the MPD file generated by the first processing unit and the DASH streaming media data converted by the first processing unit; where:

the second processing unit includes: a first determining subunit, configured to determine, according to the found bit rate representation, the DASH streaming media data that is corresponding to the UE and stored by the storage unit; and the sending unit is further configured to send the DASH streaming media data determined by the first determining subunit to the UE.

In the fourth aspect or the first possible, second possible, third possible, or fourth possible implementation of the fourth aspect, a fifth possible implementation of the fourth aspect is further provided, where in the fifth possible implementation of the fourth aspect, the receiving unit is further configured to receive a same data request;

the sending unit is further configured to send the MPD file to the UE when the receiving unit receives the same data request;

the processing unit is further configured to determine, according to a DASH streaming media data request indication that is received by the receiving unit and matches a current channel condition of the UE, the DASH streaming media data corresponding to the UE; and the sending unit is further configured to send the DASH streaming media data determined by the processing unit to the UE.

In a fifth aspect, the present invention further provides an electronic device, including:

a receiver, configured to receive a data request sent by a user equipment UE, where the data request is used to request a media presentation description MPD file from a streaming media server;

a transmitter, configured to forward, when the UE does not support a dynamic adaptive steaming over the Hypertext Transfer Protocol HTTP DASH technology, the data request received by the receiver to the streaming media server; where the receiver is configured to receive the requested MPD file that is delivered by the streaming media server according to the data request sent by the transmitter; and a processor, configured to acquire DASH streaming media data from the streaming media server according to the MPD file received by the receiver, where a rate at which the DASH streaming media data is transmitted matches a bit rate selected from the MPD file, and the transmitter is configured to send the DASH streaming media data acquired by the processor to the UE.

In a first possible implementation of the fifth aspect, the processor is further configured to determine, according to the data request received by the receiver, whether the UE supports the DASH technology over HTTP.

In the fifth aspect or the first possible implementation of the fifth aspect, a second possible implementation of the fifth aspect is further provided, where in the second possible implementation of the fifth aspect, the processor is further configured to:

acquire DASH capability information of the UE from a mobility management control entity when a bearer is established or modified, and learn, according to the DASH capability information, whether the UE supports the DASH technology over HTTP; or acquire DASH capability information of the UE from the data request, and learn, according to the DASH capability information, whether the UE supports the DASH technology over HTTP.

In the fifth aspect or the first possible or second possible implementation of the fifth aspect, a third possible implementation of the fifth aspect is further provided, where in the third possible implementation of the fifth aspect, the processor is configured to:

search for, in the MPD file, a bit rate representation that matches the rate at which the DASH streaming media data is transmitted; and determine the DASH streaming media data according to the found bit rate representation; and the transmitter is configured to send a DASH streaming media data request corresponding to the DASH streaming media data determined by the processor to the streaming media server;

the receiver is configured to receive the DASH streaming media data that is sent by the streaming media server according to the DASH streaming media data request sent by the transmitter; and the transmitter is further configured to send the DASH streaming media data received by the receiver to the UE.

In the fifth aspect or the first possible, second possible, or third possible implementation of the fifth aspect, a fourth possible implementation of the fifth aspect is further provided, where in the fourth possible implementation of the fifth aspect, the electronic device further includes:

a storage, configured to store the MPD file received by the receiver and the DASH streaming media data acquired by the processor; where:

the processor is further configured to: when a same data request is received, search for, according to the MPD file stored by the storage, the bit rate representation that matches the rate at which the DASH streaming media data is transmitted; and determine the DASH streaming media data according to the found bit rate representation; and the transmitter is further configured to send the DASH streaming media data determined by the processor to the UE.

In a sixth aspect, the present invention further provides an electronic device, including:

a receiver, configured to receive a data request sent by a user equipment UE, where the data request is used to request streaming media data from a streaming media server;

a transmitter, configured to send the data request received by the receiver to the streaming media server when the streaming media server does not support a dynamic adaptive steaming over the Hypertext Transfer Protocol HTTP DASH technology; where the receiver is further configured to receive, after the transmitter sends the data request, the requested streaming media data sent by the streaming media server; and a processor, configured to convert the streaming media data received by the receiver into DASH streaming media data and generate a media presentation description MPD file; where:

the transmitter is configured to send the MPD file generated by the processor to the UE, so that the UE acquires the DASH streaming media data according to the MPD file, where a bit rate of the DASH streaming media data matches a rate at which the DASH streaming media data is transmitted; or the processor is configured to select, according to the generated MPD file, DASH streaming media data corresponding to the UE from the DASH streaming media data, where the rate at which the DASH streaming media data is transmitted matches a bit rate selected from the MPD file; and the transmitter is configured to send the DASH streaming media data that is corresponding to the UE and selected by the processor to the UE.

In a first possible implementation of the sixth aspect, the processor is further configured to determine, according to the data request received by the receiver, whether the streaming media server supports the DASH technology over HTTP.

In the sixth aspect or the first possible implementation of the sixth aspect, a second possible implementation of the sixth aspect is further provided, where in the second possible implementation of the sixth aspect, the processor is further configured to acquire DASH capability information of the streaming media server, and learn, according to the DASH capability information, whether the streaming media server supports the DASH technology over HTTP.

In the sixth aspect or the first possible or second possible implementation of the sixth aspect, a third possible implementation of the sixth aspect is further provided, where in the third possible implementation of the sixth aspect, the processor is further configured to:

search for, in the MPD file, a bit rate representation that matches the rate at which the DASH streaming media data is transmitted; and determine, according to the found bit rate representation, the DASH streaming media data corresponding to the UE; and the transmitter is further configured to send the DASH streaming media data determined by the processor to the UE.

In the sixth aspect or the first possible, second possible, or third possible implementation of the sixth aspect, a fourth possible implementation of the sixth aspect is further provided, where in the fourth possible implementation of the sixth aspect, the electronic device further includes:

a storage, configured to store the MPD file generated by the processor and the DASH streaming media data converted by the processor; where:

the processor is further configured to determine, according to the found bit rate representation, the DASH streaming media data that is corresponding to the UE and stored by the storage; and the transmitter is further configured to send the DASH streaming media data determined by the processor to the UE.

In the sixth aspect or the first possible, second possible, third possible, or fourth possible implementation of the sixth aspect, a fifth possible implementation of the sixth aspect is further provided, where in the fifth possible implementation of the sixth aspect, the receiver is further configured to receive a same data request;

the transmitter is further configured to send the MPD file to the UE when the receiver receives the same data request;

the processor is further configured to determine, according to a DASH streaming media data request indication that is received by the receiver and matches a current channel condition of the UE, the DASH streaming media data corresponding to the UE in the storage; and the transmitter is further configured to send the DASH streaming media data determined by the processor to the UE.

In the method and the apparatus for transmitting streaming media data according to the present invention, a data request sent by a user equipment UE is received, where the data request is used to request a media presentation description MPD file from a streaming media server; when the UE does not support a DASH technology over HTTP, the data request is forwarded to the streaming media server, and the requested MPD file delivered by the streaming media server according to the data request is received; and DASH streaming media data is acquired from the streaming media server according to the MPD file, and the DASH streaming media data is sent to the UE, where a rate at which the DASH streaming media data is transmitted matches a bit rate selected from the MPD file. In this way, a problem that the UE cannot acquire, when the UE does not support the DASH technology, the DASH streaming media data that matches the bit rate in the MPD file due to a failure of parsing the MPD file is avoided, so that the UE directly receives the DASH streaming media data after sending the data request, and when the UE does not support the DASH technology, the DASH technology can be implemented between the UE and the streaming media server.

In another method and apparatus for transmitting streaming media data according to the present invention, a data request sent by a user equipment UE is received, where the data request is used to send a data request to a streaming media server; if the streaming media server does not support a dynamic adaptive steaming over the Hypertext Transfer Protocol HTTP DASH technology, the data request is sent to the streaming media server; the requested streaming media data sent by the streaming media server is received; the streaming media data is converted into DASH streaming media data, and a media presentation description MPD file is generated; and the MPD file is sent to the UE, so that the UE acquires the DASH streaming media data according to the MPD file, where a bit rate of the DASH streaming media data matches a rate at which the DASH streaming media data is transmitted; or DASH streaming media data corresponding to the UE is selected from the DASH streaming media data according to the MPD file, and the DASH streaming media data is sent to the UE, where the rate at which the DASH streaming media data is transmitted matches a bit rate selected from the MPD file. In this way, a problem that the streaming media server cannot acquire, when the streaming media server does not support the DASH technology, DASH streaming media data that matches a bit rate in the MPD file due to a failure of parsing the MPD file is avoided, so that the UE directly receives the DASH streaming media data after sending the data request, and when the streaming media server does not support the DASH technology, the DASH technology can be implemented between the streaming media server and the UE.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be particularly noted that when being implemented, a method provided in an embodiment of the present invention may be embedded as a logical unit into network elements that are based on a wireless technology, such as a radio network controller (RNC), a base station controller (BSC), an evolved base station (eNB), a universal terrestrial radio access network (UTRAN), and an evolved universal terrestrial radio access network (E-UTRAN), and devices in a core network, such as a serving gateway (S-GW), a packet data network gateway (P-GW), a gateway GPRS support node (GGSN), and a serving GPRS support node (SGSN). Any one of the network elements has a function of forwarding an HTTP request sent by a UE and therefore is capable of receiving a data request sent by the UE. For ease of description, the network elements embedded with the logical unit of the present invention are collectively called agent network elements in the present invention. The above examples are only examples in the present invention, and the present invention includes but is not limited to the foregoing description.

Figure 1:
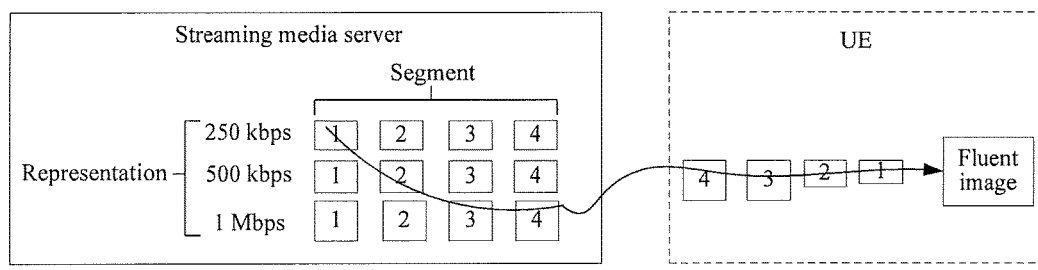
FIG. 1 is a schematic diagram of a DASH technology in the prior art.

Composition and a use process of a DASH media file are as follows: The DASH media file is formed by two parts, namely, a media presentation description (MPD) file and a streaming media file. A streaming media server first generates different representations (Representation) with multiple bit rates for a same streaming media file, and each representation further includes multiple segments (Segment). Generally, each segment lasts a few seconds or more than ten seconds, and a UE may select a segment of a different representation according to a current network transmission condition. Both a "representation" and a "segment" of streaming media are described in detail in an MPD file. After acquiring the MPD file, the UE is capable of searching for a representation of close streaming media according to a current network condition and requesting a segment thereof to acquire continuous streaming media. A streaming media file based on a DASH technology and a process of acquiring a DASH streaming media file are shown in FIG. 1. Each row indicates a representation of a media file, and each representation is cut into multiple segments. The UE is capable of acquiring a DASH streaming media file with different bit rates by switching back and forth between segments under different representations. If initial channel quality of the UE is poor, a first segment with a low bit rate 250 kbps is selected; after transmission of the first segment with 250 kbps is completed, it is discovered that a channel condition gets better, and in this case, a second segment with 500 kbps is selected to be transmitted. In this way, video/audio quality is improved in the case that transmission continuity is ensured. That is, the UE is capable of selecting segments with various bit rates according to the channel condition in real time until a playback ends, thereby improving data definition on the premise that data continuity is maintained, and further improving viewing quality on the premise that viewing continuity is implemented for a user. However, when a network-side server cannot generate a DASH media file or the UE cannot parse the MPD file, the DASH technology cannot be implemented between the UE and the network-side server. To solve the above technical problem, the present invention provides solutions to the technical problem, which are described in the following embodiments.

Figure 2:
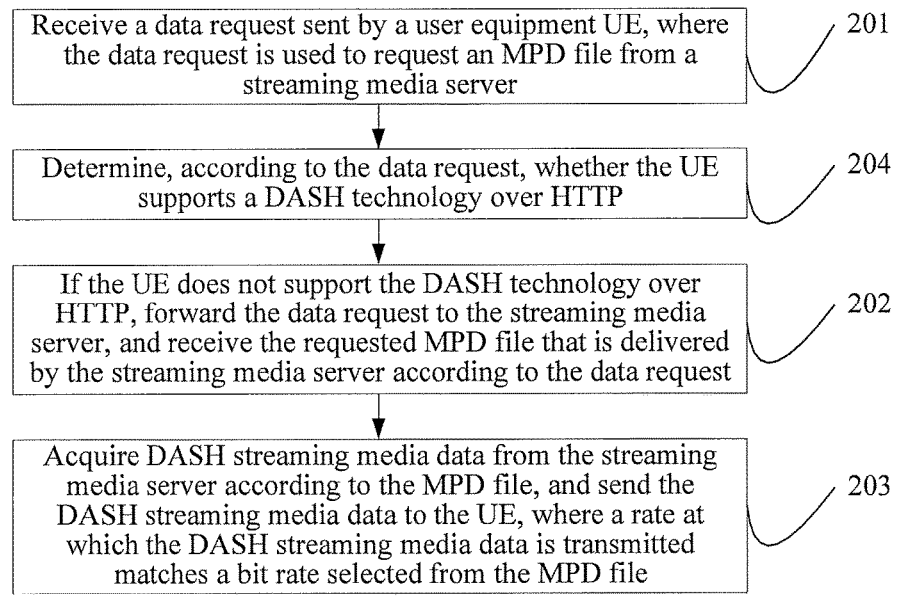
FIG. 2 is a flowchart of a method for transmitting streaming media data according to an embodiment of the present invention.

As shown in FIG. 2, an embodiment of the present invention provides a method for transmitting streaming media data, including:

201. Receive a data request sent by a user equipment UE, where the data request is used to request an MPD file from a streaming media server.

Both the MPD file and media files (including a streaming media file and a DASH streaming media file) are stored in the streaming media server. Therefore, the UE needs to access the MPD file in the streaming media server through a URL of the MPD file. That is, the UE needs to send the data request to the streaming media server, so as to request the MPD file from the streaming media server through the data request. In this case, the data request carries the URL (Uniform Resource Locator) corresponding to the MPD file.

For the UE, the MPD file is acquired just through the URL of the MPD file.

202. If the UE does not support a DASH technology over HTTP, forward the data request to the streaming media server, and receive the requested MPD file that is delivered by the streaming media server according to the data request.

203. Acquire DASH streaming media data from the streaming media server according to the MPD file, and send the DASH streaming media data to the UE, where a rate at which the DASH streaming media data is transmitted matches a bit rate selected from the MPD file.

In the method for transmitting streaming media data according to the present invention, a data request sent by a user equipment UE is received, where the data request is used to request a media presentation description MPD file from a streaming media server; when the UE does not support a DASH technology over HTTP, the data request is forwarded to the streaming media server, and the requested MPD file delivered by the streaming media server according to the data request is received; and DASH streaming media data is acquired from the streaming media server according to the MPD file, and the DASH streaming media data is sent to the UE, where a rate at which the DASH streaming media data is transmitted matches a bit rate selected from the MPD file. In this way, a problem that the UE cannot acquire, when the UE does not support the DASH technology, the DASH streaming media data that matches the bit rate in the MPD file due to a failure of parsing the MPD file is avoided, so that the UE directly receives the DASH streaming media data after sending the data request, and when the UE does not support the DASH technology, the DASH technology can be implemented between the UE and the streaming media server.

An embodiment of the present invention provides another method for transmitting streaming media data. This embodiment is similar to the embodiment shown in FIG. 2. A difference lies in that this embodiment further includes:

204. Determine, according to the data request, whether the UE supports the DASH technology over HTTP.

Manner 1: Acquire DASH capability information of the UE from a mobility management control entity when a bearer is established or modified, and learn, according to the DASH capability information, whether the UE supports the DASH technology over HTTP; or Manner 2: Acquire DASH capability information of the UE from the data request, and learn, according to the DASH capability information, whether the UE supports the DASH technology over HTTP.

In manner 1, a usage scenario of a manner of acquiring the UE capability information through a communication network is as follows:

After being started up, the UE automatically connects to the communication network, for example, a Long Term Evolution (LTE) system, and implements a communication function such as making a call by attaching to the network and then logging in to the network. In an attachment process, the UE needs to log in through an attach request. The attach request may carry the DASH capability information of the UE, for example, a DASH capability may be identified by using a flag bit in the attach request. The UE sends, to the mobility management control entity having a network management function, the attach request carrying the capability information, and the mobility management control entity stores the capability information in the attach request. When a bearer is established or modified, an agent network element acquires the DASH capability information of the UE from the mobility management control entity. Alternatively, the DASH capability information of the UE is stored in an HSS as a part of UE subscription information, and the mobility management control entity acquires the capability information directly from the HSS and sends the capability information to the agent network element.

In manner 1, the mobility management control entity may be a mobility management entity (Mobility Management Entity, MME for short) or another mobility management control entity such as a serving GPRS support node (serving GPRS support node, SGSN for short). The MME is applicable to a Long Term Evolution (Long Term Evolution, LTE for short) network, and the SGSN is applicable to a Universal Mobile Telecommunications System (Universal Mobile Telecommunications System, UMTS for short) network.

In manner 2: a usage scenario of a manner of acquiring the UE capability information through the Internet is as follows:

After an agent network element establishes a connection with the UE, the UE may encapsulate its DASH capability information into the data request (an HTTP request), and the agent network element is capable of acquiring the DASH capability information of the UE from the data request and further learning, according to the DASH capability information, whether the UE supports the DASH technology.

In the another method for transmitting streaming media data according to this embodiment of the present invention, UE capability information is acquired through a communication network and the Internet, thereby ensuring determining reliability in step 204.

Figure 3:
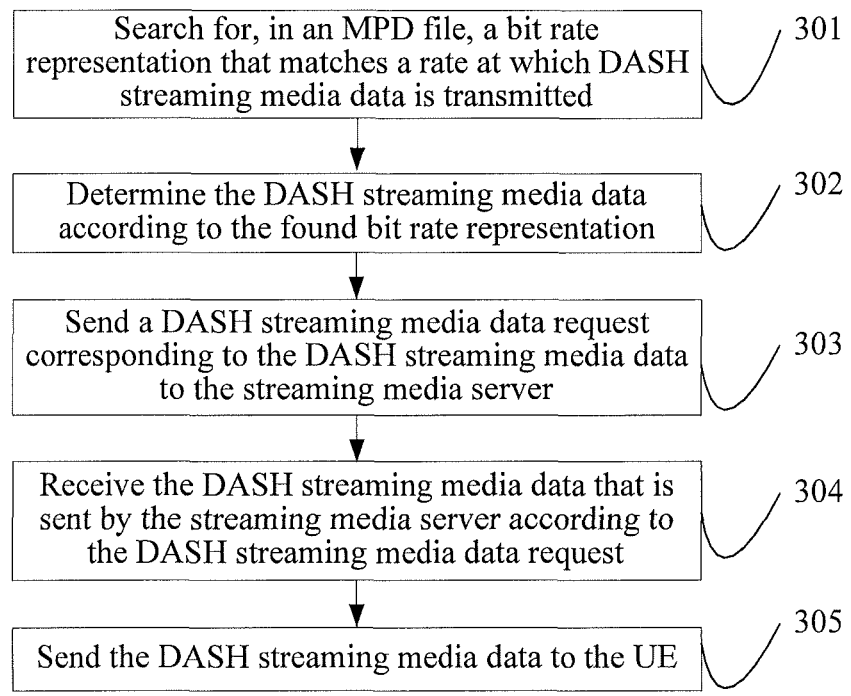
FIG. 3 is a flowchart of a method for transmitting streaming media data according to another embodiment among the embodiments of the present invention.

An embodiment of the present invention provides another method for transmitting streaming media data. As shown in FIG. 3, this embodiment further describes step 203 in the embodiment shown in FIG. 2. That is, acquiring, according to an MPD file, DASH streaming media data that matches a current channel condition of a UE from a streaming media server, and sending the DASH streaming media data to the UE includes:

301. Search for, in the MPD file, a bit rate representation that matches a rate at which the DASH streaming media data is transmitted.

It is assumed that the channel condition (namely, a channel rate) of the UE is 0-100 Mbps, and DASH streaming media data segment descriptions corresponding to bit rate representations 0-10 Mbps, 10-20 Mbps, . . . , and 90-100 Mbps are recorded in the MPD file. If a current channel rate of the UE is 35 Mbps, a DASH streaming media data segment description corresponding to the bit rate representation 30-40 Mbps is selected.

302. Determine the DASH streaming media data according to the found bit rate representation.

For example, after the bit rate representation 30-40 Mbps is determined in step 301, if the streaming media data segment description is segmented into four DASH streaming media segments, the first three DASH streaming media segments have been received currently, and the current channel rate of the UE is 35 Mbps, a fourth DASH streaming media segment under the bit rate representation 30-40 Mbps is determined as the DASH streaming media data. This implements that the DASH streaming media data is determined according to a current receiving state and the current channel condition.

303. Send a DASH streaming media data request corresponding to the DASH streaming media data to the streaming media server.

The DASH streaming media data request is sent to the streaming media server, where the DASH streaming media data request is used to request the streaming media server to deliver the fourth DASH streaming media segment under the bit rate representation 30-40 Mbps.

304. Receive the DASH streaming media data that is sent by the streaming media server according to the DASH streaming media data request.

305. Send the DASH streaming media data to the UE.

In the another method for transmitting streaming media data according to this embodiment of the present invention, an appropriate bit rate representation can be selected for a UE by searching for, in an MPD file, a bit rate representation that matches a rate at which DASH streaming media data is transmitted; after the bit rate representation is determined, DASH streaming media data to be received by the UE is determined according to a receiving state of the UE, so that DASH streaming media data that matches the bit rate representation is selected for the UE according to the MPD file and a current different channel condition of the UE.

Figure 4:
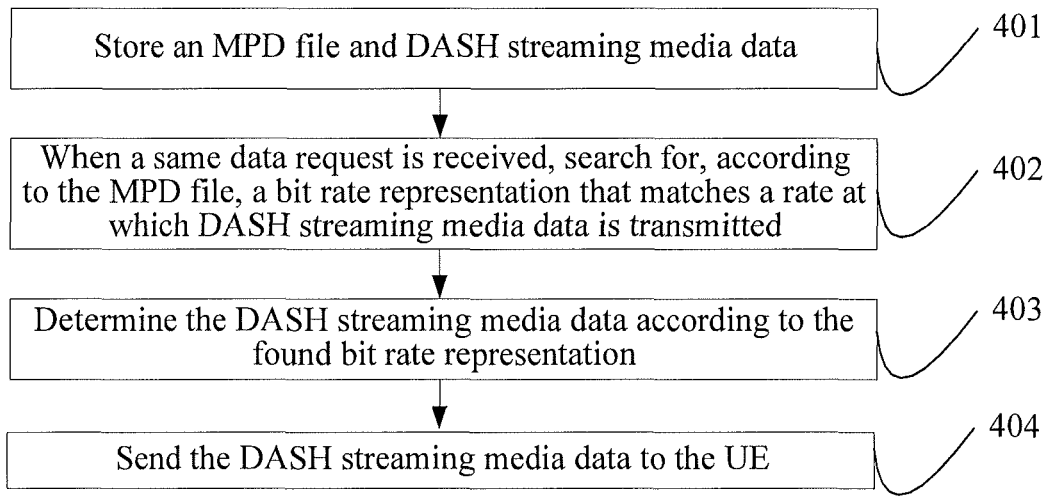
FIG. 4 is a flowchart of a method for transmitting streaming media data according to another embodiment among the embodiments of the present invention.

As shown in FIG. 4, to reduce the number of times of interaction with a streaming media server, an embodiment of the present invention provides another method for transmitting streaming media data. This embodiment is similar to the embodiment shown in FIG. 2. A difference lies in that after step 203, the method further includes:

401. Store the MPD file and the DASH streaming media data.

402. When a same data request is received, search for, according to the MPD file, a bit rate representation that matches a rate at which the DASH streaming media data is transmitted.

403. Determine the DASH streaming media data according to the found bit rate representation.

404. Send the DASH streaming media data to the UE.

After the MPD file and the DASH streaming media data are stored, when a same data request is received, an agent network element may determine the DASH streaming media data directly according to the stored MPD file and does not need to acquire the MPD file and the DASH streaming media data from the streaming media server again. This reduces a step of acquiring, by the agent network element, the MPD file and the DASH streaming media data from the streaming media server, thereby improving a rate of acquiring, by the UE, the DASH streaming media data, saving an air interface resource, and ensuring media playback fluency. In addition, the UE does not need to parse the MPD file, thereby reducing complexity of the UE and improving efficiency of one or more other functions of the UE.

Further, before step 201 in the embodiment shown in FIG. 2, the method may further include: establishing, by the UE, a network connection with the streaming media server. During implementation, the foregoing embodiments and this embodiment may be implemented in a manner of combining two of them or in a manner of combining multiple of them.

The network connection may be a connection based on the Transmission Control Protocol/Internet Protocol (Transmission Control Protocol/Internet Protocol, TCP/IP for short) or a connection based on the User Datagram Protocol (User Datagram Protocol, UDP for short). After establishing a network connection with the streaming media server, the UE may acquire, through a specified URL, a file or data, for example, an MPD file and DASH streaming media data, stored in the streaming media server.

In the method for transmitting streaming media data according to this embodiment of the present invention, technical solutions to acquiring of UE capability information through a communication network and the Internet are provided in manner 1 and manner 2 and ensure determining reliability in step 204.

Figure 5:
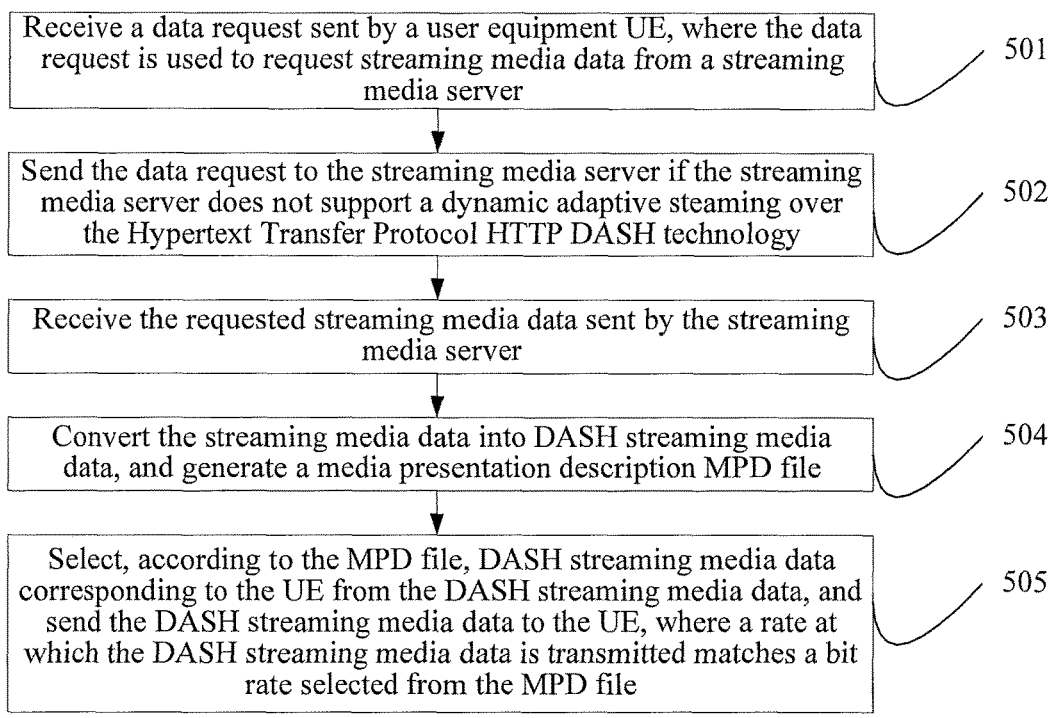
FIG. 5 is a flowchart of a method for transmitting streaming media data according to another embodiment among the embodiments of the present invention.

As shown in FIG. 5, an embodiment of the present invention provides another method for transmitting streaming media data, including:

501. Receive a data request sent by a user equipment UE, where the data request is used to request streaming media data from a streaming media server.

The data request triggered by the UE through a link or the like points to a streaming media data file in the streaming media server.

502. Send the data request to the streaming media server if the streaming media server does not support a dynamic adaptive steaming over the Hypertext Transfer Protocol HTTP DASH technology.

For the purpose of providing the UE with an MPD file and DASH streaming media data that support the DASH technology, streaming media data stored in the streaming media server needs to be used as a basis, and therefore the data request is sent to the streaming media server.

503. Receive the requested streaming media data sent by the streaming media server.

504. Convert the streaming media data into DASH streaming media data, and generate a media presentation description MPD file.

After the streaming media data requested from the streaming media server is converted into the DASH streaming media data and the MPD file is generated, communication that supports the DASH technology may be provided for the UE, so that the UE can be provided with the MPD file and the DASH streaming media data that support the DASH technology.

505. Select, according to the MPD file, DASH streaming media data corresponding to the UE from the DASH streaming media data, and send the DASH streaming media data to the UE, where a rate at which the DASH streaming media data is transmitted matches a bit rate selected from the MPD file.

When the UE supports the DASH technology or the UE does not support the DASH technology, to enable the UE to directly receive the DASH streaming media data without the need of processing the MPD file, an agent network element selects, for the UE, DASH streaming media data whose bit rate matches a current channel condition of the UE, and sends the DASH streaming media data to the UE, so that the UE is capable of directly outputting the received DASH streaming media data.

In the another method for transmitting streaming media data according to the present invention, a data request sent by a user equipment UE is received, where the data request is used to send a data request to a streaming media server; if the streaming media server does not support a dynamic adaptive steaming over the Hypertext Transfer Protocol HTTP DASH technology, the data request is sent to the streaming media server; the requested streaming media data sent by the streaming media server is received; the streaming media data is converted into DASH streaming media data, and a media presentation description MPD file is generated; and DASH streaming media data corresponding to the UE is selected from the DASH streaming media data according to the MPD file, and the DASH streaming media data is sent to the UE, where a rate at which the DASH streaming media data is transmitted matches a bit rate selected from the MPD file. In this way, a problem that the streaming media server cannot acquire, when the streaming media server does not support the DASH technology, DASH streaming media data that matches a bit rate in the MPD file due to a failure of parsing the MPD file is avoided, so that the streaming media server directly receives the DASH streaming media data after sending the data request, and when the streaming media server does not support the DASH technology, the DASH technology can be implemented between the streaming media server and the UE.

Figure 6:
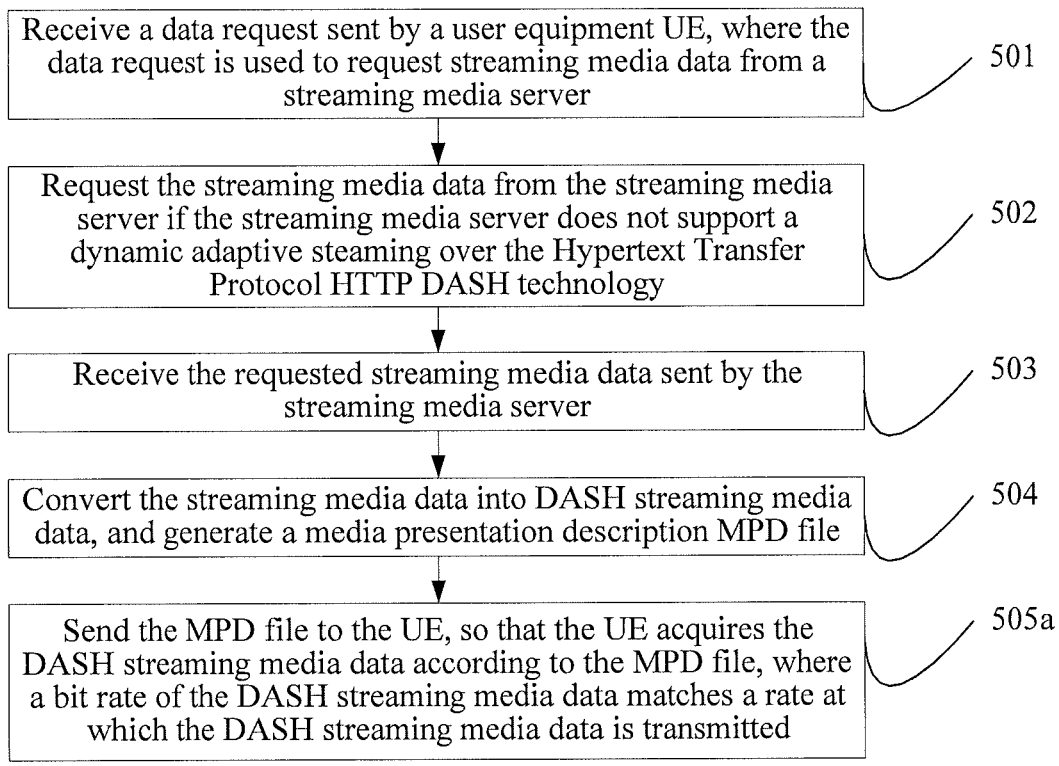
FIG. 6 is a flowchart of a method for transmitting streaming media data according to another embodiment among the embodiments of the present invention.

An embodiment of the present invention provides another method for transmitting streaming media data. As shown in FIG. 6, steps 501-504 in this embodiment are similar to steps 501-504 in the embodiment shown in FIG. 5. A difference lies in step 505a, and details are as follows:

505a. Send the MPD file to the UE, so that the UE acquires the DASH streaming media data according to the MPD file, where a bit rate of the DASH streaming media data matches the rate at which the DASH streaming media data is transmitted.

When the streaming media server does not support the DASH technology, after receiving the data request sent by the UE, the agent network element converts the streaming media data sent by the streaming media server into DASH streaming media data and generates an MPD file. When the UE supports the DASH technology, the agent network element may send the MPD file to the UE. The UE may acquire, according to the received MPD file, the DASH streaming media data by using the agent network element.

In another method for transmitting streaming media data according to the present invention, a data request sent by a user equipment UE is received, where the data request is used to send a data request to a streaming media server; if the streaming media server does not support a dynamic adaptive steaming over the Hypertext Transfer Protocol HTTP DASH technology, the data request is sent to the streaming media server; the requested streaming media data sent by the streaming media server is received; the streaming media data is converted into DASH streaming media data, and a media presentation description MPD file is generated; and the MPD file is sent to the UE, so that the UE acquires the DASH streaming media data according to the MPD file, where a bit rate of the DASH streaming media data matches a rate at which the DASH streaming media data is transmitted. In this way, a problem that the streaming media server cannot acquire, when the streaming media server does not support the DASH technology, DASH streaming media data that matches a bit rate in the MPD file due to a failure of parsing the MPD file is avoided, so that the streaming media server directly receives the DASH streaming media data after sending the data request, and when the streaming media server does not support the DASH technology, the DASH technology can be implemented between the streaming media server and the UE.

Figure 7:
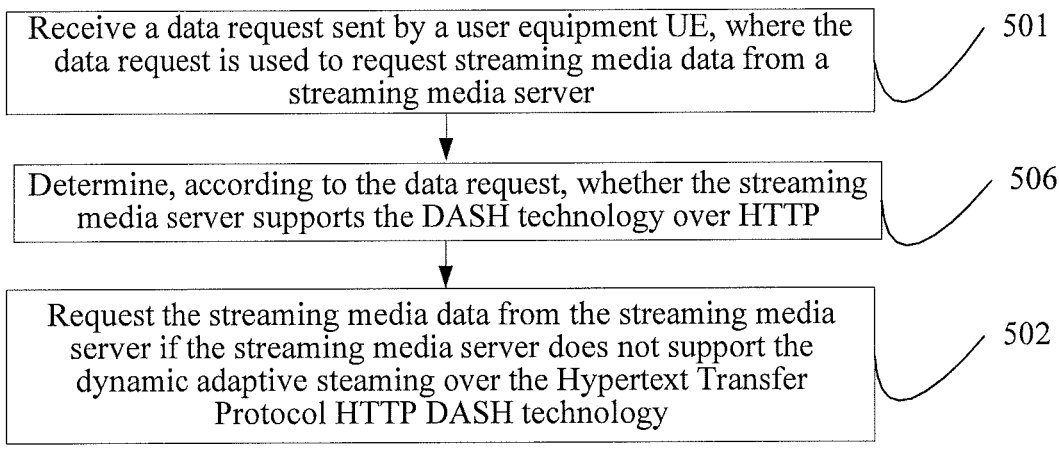
FIG. 7 is a flowchart of a method for transmitting streaming media data according to another embodiment among the embodiments of the present invention.

An embodiment of the present invention provides another method for transmitting streaming media data. As shown in FIG. 7, this embodiment is similar to the embodiments shown in FIG. 5 and FIG. 6. A difference lies in that this embodiment further includes:

506. Determine, according to the data request, whether the streaming media server supports the DASH technology over HTTP.

This embodiment specifically includes:

acquiring DASH capability information of the streaming media server, and learning, according to the DASH capability information, whether the streaming media server supports the DASH technology over HTTP.

The determining about whether the streaming media server supports DASH can be completed before step 502. That is, step 506 may be executed after step 501, and step 506 may also be executed before step 501. FIG. 7 shows only the process of executing step 506 after step 501. The DASH capability information of the streaming media server may be stored in the agent network element or stored in the streaming media server by using a configuration file. The DASH capability information of the streaming media server may be acquired by querying the configuration file, and it is learned, according to the DASH capability information, whether the streaming media server supports the DASH technology. The streaming media server may also be distinguished by using an IP address in the data request. IP addresses of different vendors are different. Therefore, the IP addresses may be used to identify different streaming media servers (For example, IP addresses are used to distinguish sina, yahoo, sohu, youku, and the like), and it can be learned, by identifying an EP address, whether a streaming media server supports the DASH technology. For example, when all streaming media servers of Sina do not support the DASH technology and all streaming media servers of Tencent support the DASH technology, it can be learned, by using the IP address in the data request, whether the streaming media server supports the DASH technology.

Figure 8:
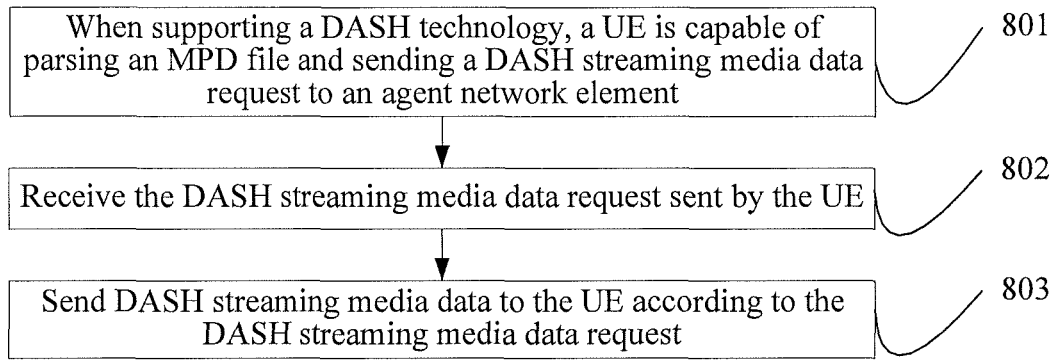
FIG. 8 is a flowchart of a method for transmitting streaming media data according to another embodiment among the embodiments of the present invention.

An embodiment of the present invention provides another method for transmitting streaming media data. This embodiment is supplementary explanation for the embodiment shown in FIG. 7. That is, as shown in FIG. 8, after step 505*a* is executed, this embodiment further includes:

801. When supporting the DASH technology, the UE is capable of parsing the MPD file and sending a DASH streaming media data request to the agent network element.

802. Receive the DASH streaming media data request sent by the UE.

The DASH streaming media data request is used to request DASH streaming media data that matches a current channel condition of the UE. After parsing the MPD file, the UE searches the MPD file for and determines, according to its receiving condition, a DASH streaming media data segment description that matches its current channel condition.

803. Send DASH streaming media data to the UE according to the DASH streaming media data request.

A DASH streaming media data segment to which the DASH streaming media data request points is found from the DASH streaming media data according to the DASH streaming media data request, and the DASH streaming media data segment is sent to the UE.

A DASH communication channel between the agent network and the UE may be established by using HTTP control signaling.

Before step 501, the method further includes: establishing, by the UE, a network connection with the streaming media server.

The network connection may be a connection based on the Transmission Control Protocol/Internet Protocol (Transmission Control Protocol/Internet Protocol, TCP/IP for short) or a connection based on the User Datagram Protocol (User Datagram Protocol, UDP for short). After establishing the network connection with the streaming media server, the UE may acquire, through a content URL, a file or data, for example, an MPD file, DASH streaming media data, and streaming media data, stored in the streaming media server.

To change a streaming media data request object of the UE from the streaming media server to the agent network element, before step 801, the method further includes:

responding to the data request received in step 501, and sending a data response to the UE, where the data response is used to instruct the UE to redirect the streaming media data request object. The UE sends a data request to the agent network element according to the data response, where the data request points to an MPD file in the agent network element.

Figure 9:
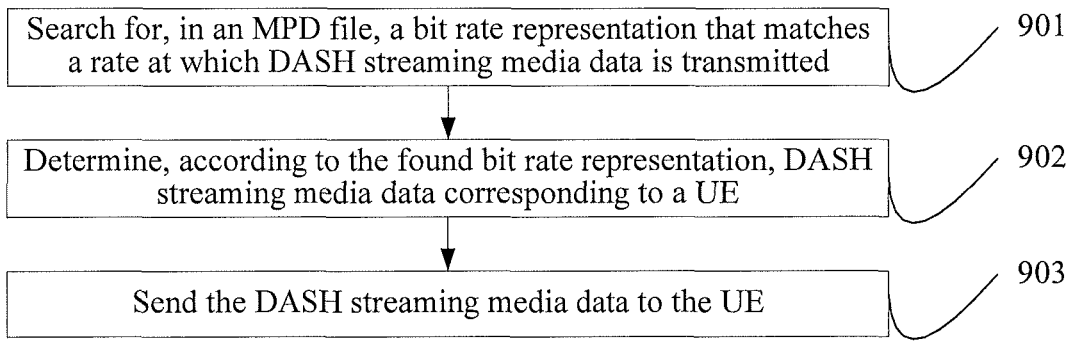
FIG. 9 is a flowchart of a method for transmitting streaming media data according to another embodiment among the embodiments of the present invention.

Further, as shown in FIG. 9, step 505 specifically includes:

Step 901: Search for, in the MPD file, a bit rate representation that matches a rate at which the DASH streaming media data is transmitted.

When the UE does not support the DASH technology or the number of times of communication between the agent network element and the UE needs to be reduced, the agent network element may take the place of the UE to execute an operation related to the DASH technology.

The MPD file is searched, according to a current channel condition of the UE, for a bit rate representation that matches the channel condition.

Step 902: Determine, according to the found bit rate representation, DASH streaming media data corresponding to the UE.

Step 903: Send the DASH streaming media data to the UE.

DASH streaming media data corresponding to a DASH streaming media data segment description found in step 902 is sent to the UE, so that the UE directly outputs the DASH streaming media data.

Figure 10:
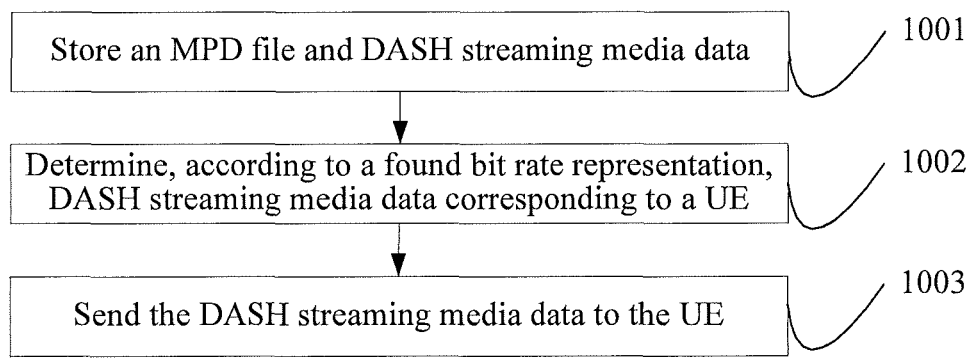
FIG. 10 is a flowchart of a method for transmitting streaming media data according to another embodiment among the embodiments of the present invention.

An embodiment of the present invention provides another method for transmitting streaming media data. This embodiment is similar to the embodiments shown in FIG. 5 and FIG. 6. As shown in FIG. 10, a difference lies in that after the DASH streaming media data is sent to the UE, the method further includes:

1001. Store the MPD file and the DASH streaming media data.

1002. Determine, according to the found bit rate representation, DASH streaming media data corresponding to the UE.

1003. Send the DASH streaming media data to the UE.

When an MPD file to which the data request received in step 501 points has been stored, there is no need to acquire streaming media data from the streaming media server and generate the MPD file and the DASH streaming media data again. This reduces the number of times of interaction with the streaming media server, further improves a transmission rate of the DASH streaming media data, and ensures media playback fluency.

An embodiment of the present invention provides another method for transmitting streaming media data. This embodiment is similar to the embodiments shown in FIG. 5 and FIG. 6. A difference lies in that after step 505, the method further includes:

when a same data request is received, sending the MPD file to the UE, determining, according to a received DASH streaming media data request indication that matches a current channel condition of the UE, the DASH streaming media data corresponding to the UE, and sending the DASH streaming media data to the UE.

After an agent network element sends the MPD file to the UE, if the UE supports the DASH technology at this time, the UE may request, according to the MPD file, DASH streaming media data that matches the current channel condition of the UE from the agent network element. The agent network element takes the place of the streaming media server to provide the DASH streaming media data for the UE according to the DASH streaming media data request indication sent by the UE.

In the another method for transmitting streaming media data according to this embodiment of the present invention, DASH streaming media data can be provided for a UE according to a request of the UE, a stored MPD file, and stored DASH streaming media data. This reduces a step of generating an MPD file and DASH streaming media data again by an agent network element, thereby improving a rate of acquiring, by the UE, the DASH streaming media data, saving an air interface resource, and ensuring media playback fluency. In addition, the UE does not need to parse the MPD file, thereby reducing complexity of the UE and improving efficiency of one or more other functions of the UE.

Figure 11:
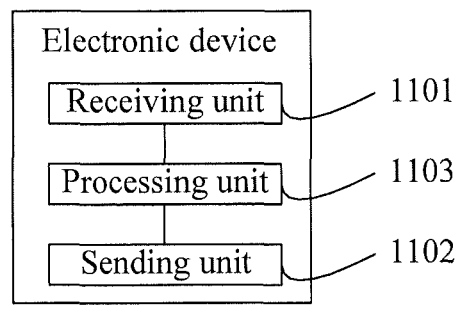
FIG. 11 is a schematic structural diagram of an electronic device according to an embodiment of the present invention.

As shown in FIG. 11, an embodiment of the present invention provides an electronic device, including a receiving unit 1101, a sending unit 1102, and a processing unit 1103.

The receiving unit 1101 is configured to receive a data request sent by a user equipment UE, where the data request is used to request a media presentation description MPD file from a streaming media server.

The sending unit 1102 is configured to forward, when the UE does not support a dynamic adaptive steaming over the Hypertext Transfer Protocol HTTP DASH technology, the data request received by the receiving unit 1101 to the streaming media server.

The receiving unit 1101 is configured to receive the requested MPD file that is delivered by the streaming media server according to the data request sent by the sending unit 1102.

The processing unit 1103 is configured to acquire DASH streaming media data from the streaming media server according to the MPD file received by the receiving unit 1101, where a rate at which the DASH streaming media data is transmitted matches a bit rate selected from the MPD file.

The sending unit 1102 is configured to send the DASH streaming media data acquired by the processing unit 1103 to the UE.

In the electronic device according to the present invention, a receiving unit 1101 receives a data request sent by a user equipment UE, where the data request is used to request a media presentation description MPD file from a streaming media server; when the UE does not support a DASH technology over HTTP, a sending unit 1102 forwards the data request to the streaming media server, and the receiving unit 1101 receives the requested MPD file that is delivered by the streaming media server according to the data request; and a processing unit 1103 acquires DASH streaming media data from the streaming media server according to the MPD file, and the sending unit 1102 sends the DASH streaming media data to the UE, where a rate at which the DASH streaming media data is transmitted matches a bit rate selected from the MPD file. In this way, a problem that the UE cannot acquire, when the UE does not support the DASH technology, the DASH streaming media data that matches the bit rate in the MPD file due to a failure of parsing the MPD file is avoided, so that the UE directly receives the DASH streaming media data after sending the data request, and when the UE does not support the DASH technology, the DASH technology can be implemented between the UE and the streaming media server.

Figure 12:
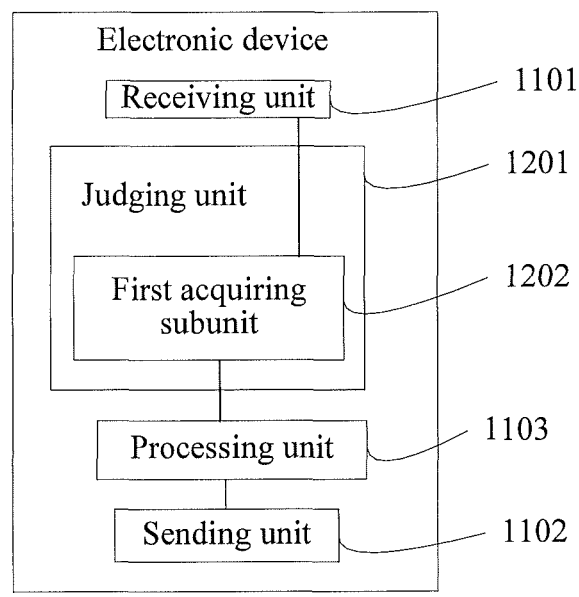
FIG. 12 is a schematic structural diagram of another electronic device according to an embodiment of the present invention.

An embodiment of the present invention provides another electronic device. This embodiment is similar to the embodiment shown in FIG. 11. As shown in FIG. 12, a difference lies in that the electronic device further includes: a judging unit 1201, configured to determine, according to the data request received by the receiving unit 1101, whether the UE supports the DASH technology over HTTP, and including:

a first acquiring subunit 1202, configured to acquire DASH capability information of the UE from a mobility management control entity when a bearer is established or modified, and learn, according to the DASH capability information, whether the UE supports the DASH technology over HTTP; or configured to acquire DASH capability information of the UE from the data request, and learn, according to the DASH capability information, whether the UE supports the DASH technology over HTTP.

A usage scenario of a manner of acquiring, by the first acquiring subunit 1202, the UE capability information through a communication network is as follows:

After being started up, the UE automatically connects to the communication network, for example, a Long Term Evolution system (Long Term Evolution, LTE for short), and implements a communication function such as making a call by attaching to the network and then logging in to the network. In an attachment process, the UE needs to log in through an attach request. The attach request may carry the DASH capability information of the UE, for example, a DASH capability may be identified by using a flag bit in the attach request. The UE sends, to the mobility management control entity having a network management function, the attach request carrying the capability information, and the mobility management control entity stores the capability information in the attach request. When a bearer is established or modified, the first acquiring subunit 1202 acquires the DASH capability information of the UE from the mobility management control entity. Alternatively, the DASH capability information of the UE is stored in an HSS as a part of UE subscription information, and the mobility management control entity acquires the capability information directly from the HSS and sends the capability information to the first acquiring subunit 1202. The mobility management control entity may be a mobility management entity (Mobility Management Entity, MME for short) or another mobility management control entity such as a serving GPRS support node (serving GPRS support node, SGSN for short). The MME is applicable to a Long Term Evolution (Long Term Evolution, LTE for short) network, and the SGSN is applicable to a Universal Mobile Telecommunications System (Universal Mobile Telecommunications System, UMTS for short) network.

A usage scenario of a manner of acquiring, by the first acquiring subunit 1202, the UE capability information through the Internet is as follows:

After an agent network element establishes a connection with the UE, the UE may encapsulate its DASH capability information into the data request (an HTTP request), and the first acquiring subunit 1202 is capable of acquiring the DASH capability information of the UE from the data request and further learning, according to the DASH capability information, whether the UE supports the DASH technology.

In the electronic device according to this embodiment of the present invention, a first acquiring subunit 1202 acquires UE capability information through a communication network and the Internet, thereby ensuring determining reliability.

Figure 13:
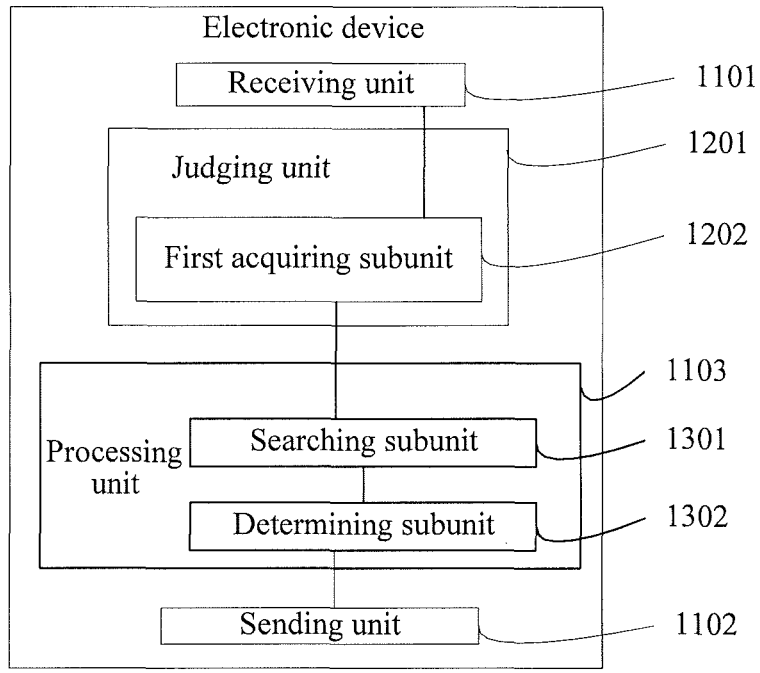
FIG. 13 is a schematic structural diagram of another electronic device according to an embodiment of the present invention.

An embodiment of the present invention provides another electronic device. This embodiment further describes the processing unit 1103 in the embodiment shown in FIG. 11. As shown in FIG. 13, the processing unit 1103 further includes a searching subunit 1301 and a determining subunit 1302.

The searching subunit 1301 is configured to search for, in the MPD file, a bit rate representation that matches the rate at which the DASH streaming media data is transmitted.

It is assumed that the channel condition (namely, a channel rate) of the UE is 0-100 Mbps, and DASH streaming media data segment descriptions corresponding to bit rate representations 0-10 Mbps, 10-20 Mbps, . . . , and 90-100 Mbps are recorded in the MPD file. If a current channel rate of the UE is 35 Mbps, the searching subunit 1301 selects a DASH streaming media data segment description of the bit rate representation 30-40 Mbps.

The determining subunit 1302 is configured to determine the DASH streaming media data according to the bit rate representation found by the searching subunit 1301.

For example, after the searching subunit 1301 finds the bit rate representation 30-40 Mbps, if the streaming media data segment description is segmented into four DASH streaming media segments, the first three DASH streaming media segments have been received currently, and the current channel rate of the UE is 35 Mbps, the determining subunit 1302 determines a fourth DASH streaming media segment under the bit rate representation 30-40 Mbps as the DASH streaming media data. This implements that the determining subunit 1302 determines the DASH streaming media data according to a current receiving state and the current channel condition.

The sending unit 1102 is further configured to send a DASH streaming media data request corresponding to the DASH streaming media data determined by the determining subunit 1302 to the streaming media server.

The sending unit 1102 sends the DASH streaming media data request to the streaming media server, where the DASH streaming media data request is used to request the streaming media server to deliver the fourth DASH streaming media segment under the bit rate representation 30-40 Mbps.

The receiving unit 1101 is further configured to receive the DASH streaming media data that is sent by the streaming media server
according to the DASH streaming media data request sent by the sending unit 1102.

The sending unit 1102 is further configured to send the DASH streaming media data received by the receiving unit 1101 to the UE.

In the another electronic device according to this embodiment of the present invention, a searching subunit 1301 is capable of selecting an appropriate bit rate representation for a UE by searching for, in an MPD file, a bit rate representation that matches a rate at which the DASH streaming media data is transmitted; after the bit rate representation is determined, a determining subunit 1302 determines, according to a receiving state of the UE, DASH streaming media data to be received by the UE, so that DASH streaming media data that matches the bit rate representation is selected for the UE according to the MPD file and a current different channel condition of the UE.

Figure 14:
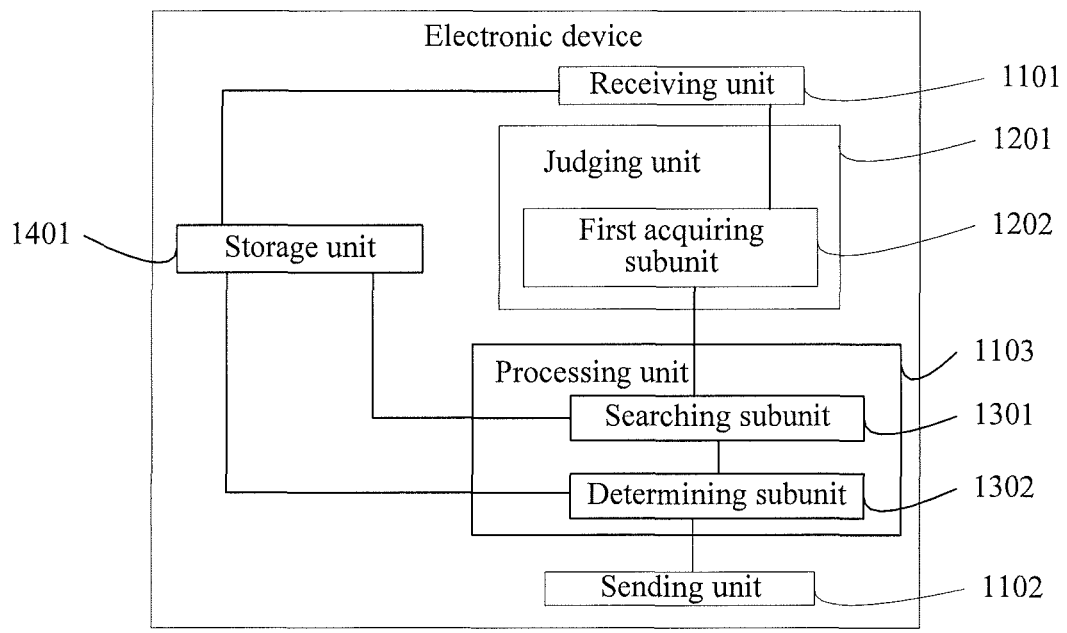
FIG. 14 is a schematic structural diagram of another electronic device according to an embodiment of the present invention.

As shown in FIG. 14, to reduce the number of times of interaction with a streaming media server, an embodiment of the present invention provides another electronic device. This embodiment is similar to the embodiment shown in FIG. 11. A difference lies in that the electronic device further includes:

a storage unit 1401, configured to store the MPD file received by the receiving unit 1101 and the DASH streaming media data acquired by the processing unit 1103.

The searching subunit 1301 is further configured to, when a same data request is received, search for, according to the MPD file stored by the storage unit 1401, a bit rate representation that matches a rate at which the DASH streaming media data is transmitted.

The determining subunit 1302 is further configured to determine the DASH streaming media data in the storage unit 1401 according to the bit rate representation found by the searching subunit 1301.

The sending unit 1102 is further configured to send the DASH streaming media data determined by the determining subunit 1302 to the UE.

After the storage unit 1401 stores the MPD file and the DASH streaming media data, when the receiving unit 1101 receives a same data request, the determining subunit 1302 may determine the DASH streaming media data directly according to the stored MPD file, without the need of acquiring the MPD file and the DASH streaming media data from the streaming media server again. This reduces the number of times of interaction between an agent network element and the streaming media server, thereby improving a transmission rate of the DASH streaming media data and ensuring media playback fluency.

In the another electronic device according to this embodiment of the present invention, an storage unit 1401 stores an MPD file and DASH streaming media data that are acquired from a streaming media server; when receiving a same data request, a receiving unit 1101 does not need to acquire the MPD file and the DASH streaming media data from the streaming media server. This reduces a step of acquiring, by an agent network element, the MPD file and the DASH streaming media data from the streaming media server, thereby improving a rate of acquiring, by the UE, the DASH streaming media data, saving an air interface resource, and ensuring media playback fluency. In addition, the UE does not need to parse the MPD file, thereby reducing complexity of the UE and improving efficiency of one or more other functions of the UE.

Figure 15:
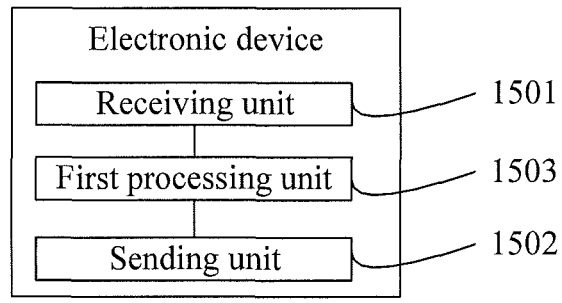
FIG. 15 is a schematic structural diagram of another electronic device according to an embodiment of the present invention.

As shown in FIG. 15, an embodiment of the present invention provides another electronic device, including a receiving unit 1501, a sending unit 1502, and a first processing unit 1503.

The receiving unit 1501 is configured to receive a data request sent by a user equipment UE, where the data request is used to request streaming media data from a streaming media server.

The sending unit 1502 is configured to send the data request to the streaming media server when the streaming media server does not support a dynamic adaptive steaming over the Hypertext Transfer Protocol HTTP DASH technology.

For the purpose of providing the UE with an MPD file and DASH streaming media data that support the DASH technology, streaming media data stored in the streaming media server needs to be used as a basis, and therefore the sending unit 1502 sends the data request to the streaming media server.

The receiving unit 1501 is configured to receive, after the sending unit 1502 sends the data request, the requested streaming media data sent by the streaming media server.

The first processing unit 1503 is configured to convert the streaming media data received by the receiving unit 1501 into DASH streaming media data and generate a media presentation description MPD file.

After converting the streaming media requested from the streaming media server into the DASH streaming media data and generating the MPD file, the first processing unit 1503 may provide the UE with communication that supports the DASH technology, so that the UE can be provided with the MPD file and the DASH streaming media data that support the DASH technology.

The sending unit 1502 is configured to send the MPD file generated by the first processing unit 1503 to the UE, so that the UE acquires the DASH streaming media data according to the MPD file, where a bit rate of the DASH streaming media data matches a rate at which the DASH streaming media data is transmitted.

After the receiving unit 1501 receives the data request sent by the UE, and when the streaming media server does not support the DASH technology, the first processing unit 1503 converts the streaming media data sent by the streaming media server into the DASH streaming media data and generates the MPD file. When the UE supports the DASH technology, the sending unit 1502 may send the MPD file to the UE. The UE may acquire, according to the received MPD file, the DASH streaming media data by using an agent network element.

In the another electronic device according to the present invention, a receiving unit 1501 receives a data request sent by a user equipment UE, where the data request is used to send a data request to a streaming media server; if the streaming media server does not support a dynamic adaptive steaming over the Hypertext Transfer Protocol HTTP DASH technology, a sending unit 1502 sends the data request to the streaming media server; the receiving unit 1501 receives the requested streaming media data sent by the streaming media server; a first processing unit 1503 converts the streaming media data into DASH streaming media data and generates a media presentation description MPD file; and the sending unit 1502 sends the MPD file to the UE, so that the UE acquires the DASH streaming media data according to the MPD file, where a bit rate of the DASH streaming media data matches a rate at which the DASH streaming media data is transmitted. In this way, a problem that the streaming media server cannot acquire, when the streaming media server does not support the DASH technology, DASH streaming media data that matches a bit rate in the MPD file due to a failure of parsing the MPD file is avoided, so that the streaming media server directly receives the DASH streaming media data after sending the data request, and when the streaming media server does not support the DASH technology, the DASH technology can be implemented between the streaming media server and the UE.

Figure 16:
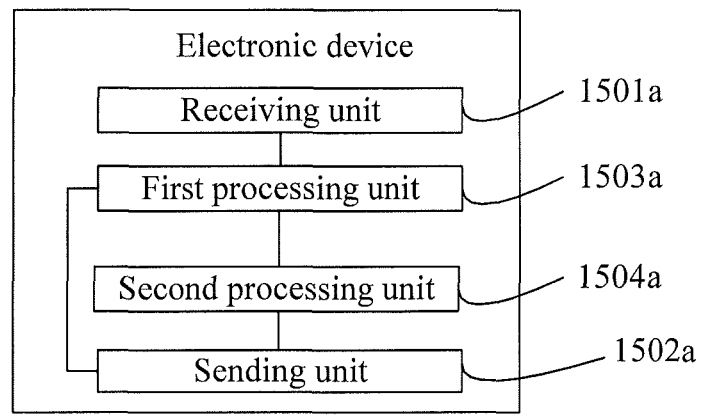
FIG. 16 is a schematic structural diagram of another electronic device according to an embodiment of the present invention.

An embodiment of the present invention provides another electronic device. As shown in FIG. 16, the electronic device includes a receiving unit 1501a, a sending unit 1502a, a first processing unit 1503a, and a second processing unit 1504a.

The receiving unit 1501a is configured to receive a data request sent by a user equipment UE, where the data request is used to request streaming media data from a streaming media server.

The sending unit 1502a is configured to send the data request received by the receiving unit to the streaming media server when the streaming media server does not support a dynamic adaptive steaming over the Hypertext Transfer Protocol HTTP DASH technology.

The receiving unit 1501a is configured to receive, after the sending unit sends the data request, the requested streaming media data sent by the streaming media server.

The first processing unit 1503a is configured to convert the streaming media data received by the receiving unit into DASH streaming media data and generate a media presentation description MPD file.

The second processing unit 1504a is configured to select, according to the MPD file generated by the first processing unit, DASH streaming media data corresponding to the UE from the DASH streaming media data, where a rate at which the DASH streaming media data is transmitted matches a bit rate selected from the MPD file.

The sending unit 1502a is further configured to send the DASH streaming media data that is corresponding to the UE and selected by the second processing unit to the UE.

When the UE supports the DASH technology or the UE does not support the DASH technology, to enable the UE to directly receive the DASH streaming media data without the need of processing the MPD file, the second processing unit selects, for the UE according to the MPD file generated by the first processing unit, DASH streaming media data whose bit rate matches a current channel condition of the UE, and the sending unit sends the DASH streaming media data to the UE, so that the UE is capable of directly outputting the received DASH streaming media data.

In the another electronic device according to the present invention, a receiving unit receives a data request sent by a user equipment UE, where the data request is used to send a data request to a streaming media server; if the streaming media server does not support a dynamic adaptive steaming over the Hypertext Transfer Protocol HTTP DASH technology, a sending unit sends the data request to the streaming media server; the receiving unit receives the requested streaming media data sent by the streaming media server; a first processing unit converts the streaming media data into DASH streaming media data and generates a media presentation description MPD file; and a second processing unit selects, according to the MPD file, DASH streaming media data corresponding to the UE from the DASH streaming media data and sends the DASH streaming media data to the UE, where a rate at which the DASH streaming media data is transmitted matches a bit rate selected from the MPD file. In this way, a problem that the streaming media server cannot acquire, when the streaming media server does not support the DASH technology, DASH streaming media data that matches a bit rate in the MPD file due to a failure of parsing the MPD file is avoided, so that the streaming media server directly receives the DASH streaming media data after sending the data request, and when the streaming media server does not support the DASH technology, the DASH technology can be implemented between the streaming media server and the UE.

Figure 17:
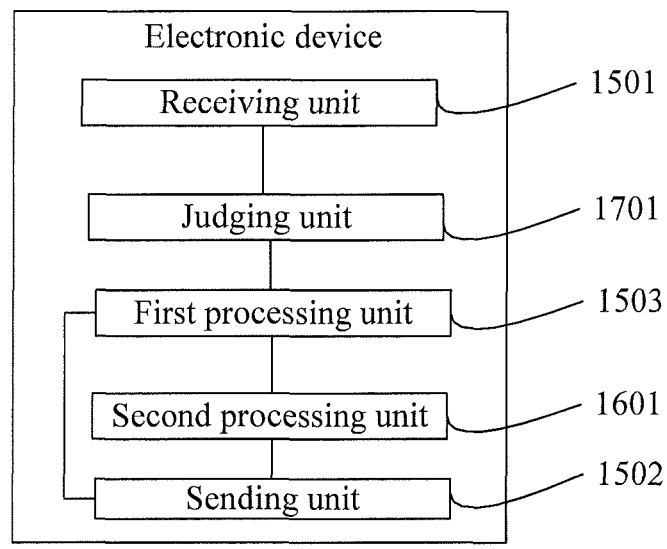
FIG. 17 is a schematic structural diagram of another electronic device according to an embodiment of the present invention.

An embodiment of the present invention provides another electronic device. This embodiment is similar to the embodiment shown in FIG. 15. As shown in FIG. 17, a difference lies in that the electronic device further includes a judging unit 1701, configured to determine, according to the data request received by the receiving unit 1501, whether a streaming media server supports the DASH technology over HTTP.

Specifically, the judging unit 1701 is specifically configured to acquire DASH capability information of the streaming media server, and learn, according to the DASH capability information, whether the streaming media server supports the DASH technology over HTTP.

An embodiment of the present invention provides another electronic device. This embodiment further describes the embodiment shown in FIG. 16, including:

a judging unit 1701a, configured to determine, according to the data request received by the receiving unit 1501a, whether the streaming media server supports the DASH technology over HTTP.

Specifically, the judging unit 1701a is specifically configured to acquire DASH capability information of the streaming media server, and learn, according to the DASH capability information, whether the streaming media server supports the DASH technology over HTTP.

Figure 18:
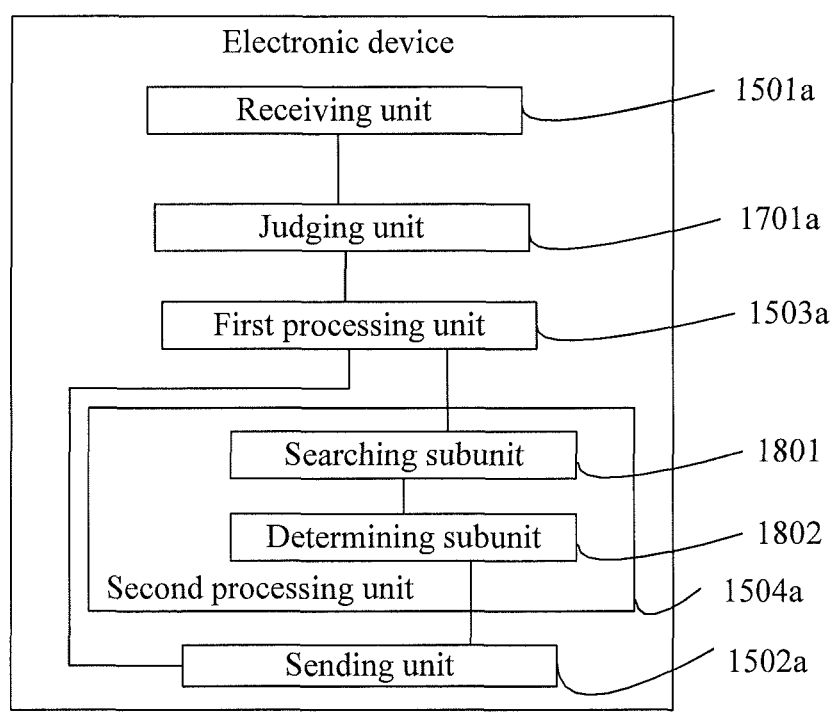
FIG. 18 is a schematic structural diagram of another electronic device according to an embodiment of the present invention.

An embodiment of the present invention provides another electronic device. This embodiment further describes the second processing unit 1504a in the embodiment shown in FIG. 16. As shown in FIG. 18, the second processing unit 1504a includes a searching subunit 1801 and a determining subunit 1802.

The searching subunit 1801 is configured to search for, in the MPD file generated by the first processing unit, a bit rate representation that matches a rate at which the DASH streaming media data converted by the first processing unit is transmitted.

When the UE does not support the DASH technology or the number of times of communication between an agent network element and the UE needs to be reduced, the searching subunit 1801 may search for, in the MPD file according to a current channel condition of the UE, a bit rate representation that matches the channel condition.

The determining subunit 1802 is configured to determine, according to the bit rate representation found by the searching subunit 1801, DASH streaming media data corresponding to the UE.

The sending unit 1502a is further configured to send the DASH streaming media data determined by the determining subunit 1802 to the UE.

The DASH streaming media data determined by the determining subunit 1802 is sent to the UE, so that the UE directly outputs the DASH streaming media data.

Figure 19:
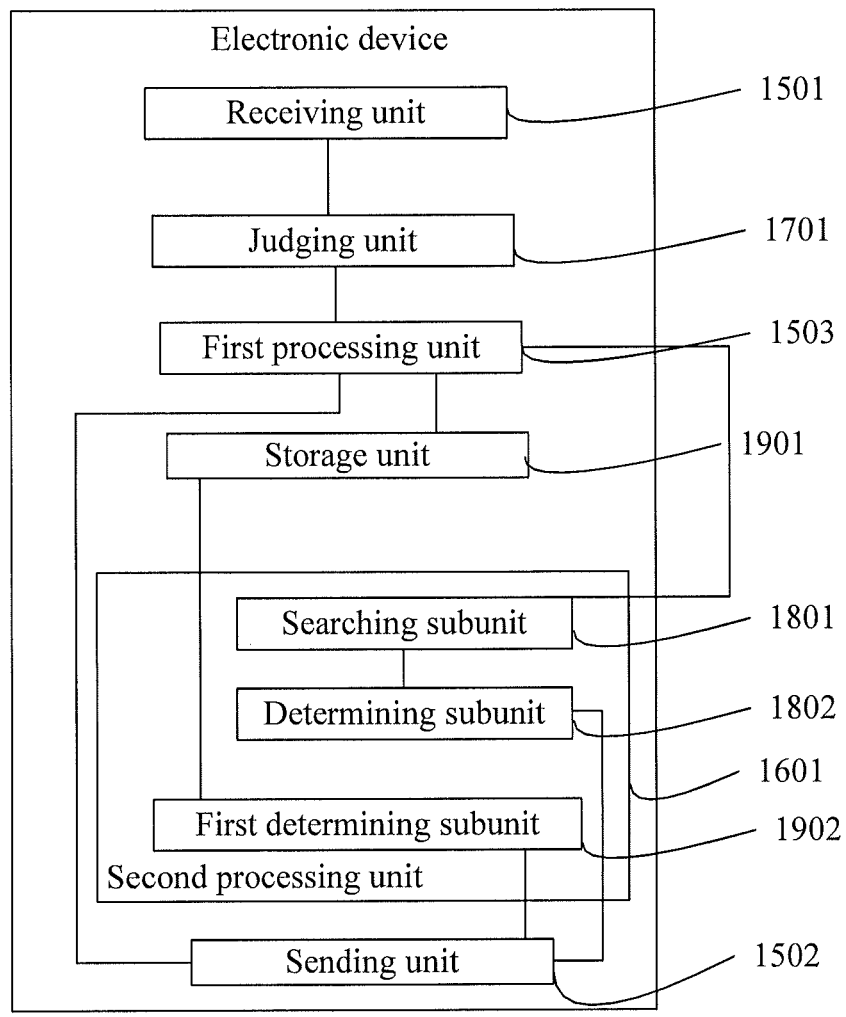
FIG. 19 is a schematic structural diagram of another electronic device according to an embodiment of the present invention.

An embodiment of the present invention provides another electronic device. This embodiment is similar to the embodiment shown in FIG. 15. As shown in FIG. 19, a difference lies in that the electronic device further includes:

a storage unit 1901, configured to store the MPD file generated by the first processing unit 1503 and the DASH streaming media data converted by the first processing unit 1503; and a first determining subunit 1902, configured to determine, according to the found bit rate representation, the DASH streaming media data that is corresponding to the UE and stored by the storage unit 1901.

The sending unit 1502 is further configured to send the DASH streaming media data determined by the first determining subunit 1902 to the UE.

When an MPD file to which a data request received by the receiving unit 1501 points has been stored, after the first determining subunit 1902 determines the DASH streaming media data corresponding to the UE in the storage unit 1901, the receiving unit 1501 does not need to acquire streaming media data from the streaming media server, and the first processing unit 1503 does not need to generate the MPD file and the DASH streaming media data again. This reduces the number of times of interaction with the streaming media server, further improves a transmission rate of the DASH streaming media data, and ensures media playback fluency.

An embodiment of the present invention provides another electronic device. This embodiment is similar to the embodiment shown in FIG. 16. A difference lies in that the electronic device further includes modules mentioned in the embodiment shown in FIG. 19 and functions executed by the modules.

An embodiment of the present invention provides another electronic device. This embodiment further describes the electronic device in the embodiment shown in FIG. 15. The receiving unit 1501 is further configured to receive a same data request. The sending unit 1502 is further configured to send the MPD file to the UE when the receiving unit 1501 receives the same data request.

The processing unit 1503 is further configured to determine, according to a DASH streaming media data request that is received by the receiving unit 1501 and matches a current channel condition of the UE, the DASH streaming media data corresponding to the UE.

The sending unit 1502 is further configured to send the DASH streaming media data determined by the processing unit 1503 to the UE.

After the sending unit 1502 sends the MPD file to the UE, if the UE supports the DASH technology at this time, the UE may send, according to the MPD file, a DASH streaming media data request that matches the current channel condition of the UE to the receiving unit 1501. The processing unit 1503 takes the place of the streaming media server to provide the DASH streaming media data for the UE according to the DASH streaming media data request sent by the UE.

When a streaming media server does not support a DASH technology and a UE supports the DASH technology, the another electronic device according to this embodiment of the present invention is capable of taking the place of the streaming media server to perform DASH communication with the UE, where the another electronic device includes: a processing unit 1503, which generates and provides an MPD file and DASH streaming media data for the UE, so as to take the place of the streaming media server to provide a DASH technology server for the UE; and a sending unit 1502, which sends the DASH streaming media data directly to the UE, thereby further reducing the number of times of communication with the UE and saving an air interface resource. The sending unit 1502 sends the DASH streaming media data directly to the UE, so that the UE does not need to parse the MPD file and the streaming media server does not need to generate the DASH streaming media data and the MPD file, thereby further reducing complexity of the UE and the streaming media server.

Figure 20:
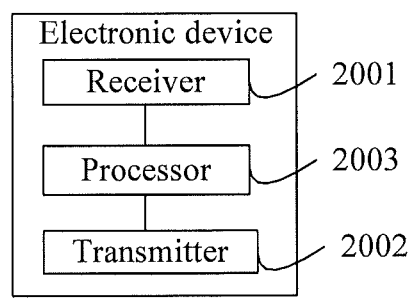
FIG. 20 is a schematic structural diagram of another electronic device according to an embodiment of the present invention.

As shown in FIG. 20, an embodiment of the present invention provides an electronic device, including a receiver 2001, a transmitter 2002, and a processor 2003.

The receiver 2001 is configured to receive a data request sent by a user equipment UE, where the data request is used to request a media presentation description MPD file from a streaming media server.

The transmitter 2002 is configured to forward, when the UE does not support a dynamic adaptive steaming over the Hypertext Transfer Protocol HTTP DASH technology, the data request received by the receiver 2001 to the streaming media server.

The receiver 2001 is configured to receive the requested MPD file that is delivered by the streaming media server according to the data request sent by the transmitter 2002.

The processor 2003 is configured to acquire DASH streaming media data from the streaming media server according to the MPD file received by the receiver 2001, where a rate at which the DASH streaming media data is transmitted matches a bit rate selected from the MPD file.

The transmitter 2002 is configured to send the DASH streaming media data acquired by the processor 2003 to the UE.

An embodiment of the present invention provides another electronic device. This embodiment further describes the embodiment shown in FIG. 20, where the processor 2003 is further configured to determine, according to the data request received by the receiver 2001, whether the UE supports the DASH technology over HTTP.

An embodiment of the present invention provides another electronic device. This embodiment further describes the embodiment shown in FIG. 20, where the processor 2003 is further configured to:

acquire DASH capability information of the UE from a mobility management control entity when a bearer is established or modified, and learn, according to the DASH capability information, whether the UE supports the DASH technology over HTTP; or acquire DASH capability information of the UE from the data request, and learn, according to the DASH capability information, whether the UE supports the DASH technology over HTTP.

An embodiment of the present invention provides another electronic device. This embodiment further describes the embodiment shown in FIG. 20, where the processor 2003 is configured to:

search for, in the MPD file, a bit rate representation that matches the rate at which the DASH streaming media data is transmitted; and determine the DASH streaming media data according to the found bit rate representation; and the transmitter 2002 is configured to send a DASH streaming media data request corresponding to the DASH streaming media data determined by the processor 2003 to the streaming media server;

the receiver 2001 is configured to receive the DASH streaming media data that is sent by the streaming media server according to the DASH streaming media data request sent by the transmitter 2002; and the transmitter 2002 is further configured to send the DASH streaming media data received by the receiver 2001 to the UE.

Figure 21:
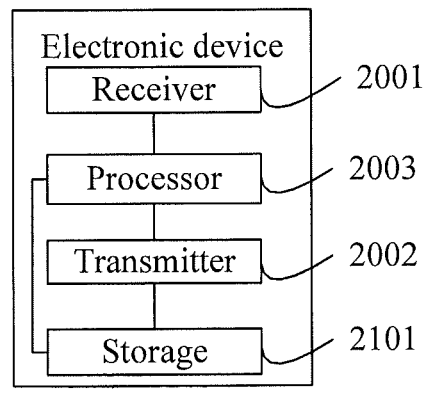
FIG. 21 is a schematic structural diagram of another electronic device according to an embodiment of the present invention.

The another electronic device according to this embodiment of the present invention is similar to that in the embodiment shown in FIG. 20. As shown in FIG. 21, a difference lies in that the electronic device further includes:

a storage 2101, configured to store the MPD file received by the receiver 2001 and the DASH streaming media data acquired by the processor 2003.

The processor 2003 is further configured to: when a same data request is received, search for, according to the MPD file stored by the storage 2101, the bit rate representation that matches the rate at which the DASH streaming media data is transmitted; and determine the DASH streaming media data according to the found bit rate representation.

The transmitter 2002 is further configured to send the DASH streaming media data determined by the processor 2003 to the UE.

Figure 22:
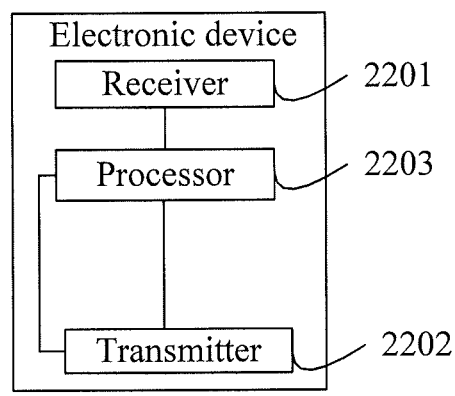
FIG. 22 is a schematic structural diagram of another electronic device according to an embodiment of the present invention.

As shown in FIG. 22, an embodiment of the present invention provides another electronic device, including a receiver 2201, a transmitter 2202, and a processor 2203.

The receiver 2201 is configured to receive a data request sent by a user equipment UE, where the data request is used to send a data request to a streaming media server.

The transmitter 2202 is configured to send the data request to the streaming media server when the streaming media server does not support a dynamic adaptive steaming over the Hypertext Transfer Protocol HTTP DASH technology.

The receiver 2201 is further configured to receive, after the transmitter 2202 sends the data request, the requested streaming media data sent by the streaming media server.

The processor 2203 is configured to convert the streaming media data received by the receiver 2201 into DASH streaming media data and generate a media presentation description MPD file.

The transmitter 2202 is configured to send the MPD file generated by the processor 2203 to the UE, so that the UE acquires the DASH streaming media data according to the MPD file, where a bit rate of the DASH streaming media data matches a rate at which the DASH streaming media data is transmitted; or the processor 2203 is configured to select, according to the generated MPD file, DASH streaming media data corresponding to the UE from the DASH streaming media data, where the rate at which the DASH streaming media data is transmitted matches a bit rate selected from the MPD file.

The transmitter 2202 is configured to send the DASH streaming media data that is corresponding to the UE and selected by the processor 2203 to the UE.

Figure 23:
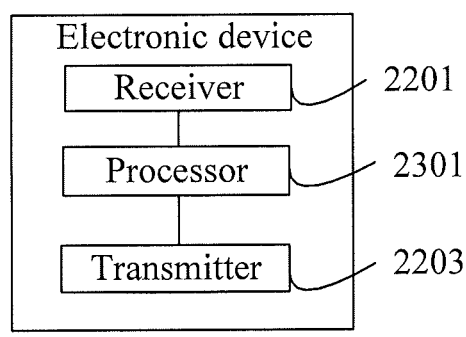
FIG. 23 is a schematic structural diagram of another electronic device according to an embodiment of the present invention.

An embodiment of the present invention provides another electronic device. This embodiment is similar to the embodiment shown in FIG. 22. As shown in FIG. 23, a difference lies in that the processor 2203 is further configured to determine, according to the data request received by the receiver 2201, whether the streaming media server supports the DASH technology over HTTP.

An embodiment of the present invention provides another electronic device. This embodiment further describes the embodiment shown in FIG. 22. As shown in FIG. 23, the processor 2203 is specifically configured to acquire DASH capability information of the streaming media server, and learn, according to the DASH capability information, whether the streaming media server supports the DASH technology over HTTP.

An embodiment of the present invention provides another electronic device. This embodiment further describes the embodiment shown in FIG. 22, where the processor 2203 is further configured to:

search for, in the generated MPD file, a bit rate representation that matches the rate at which the DASH streaming media data converted by the processor 2203 is transmitted; and determine, according to the found bit rate representation, the DASH streaming media data corresponding to the UE; and the transmitter 2202 is further configured to send the DASH streaming media data determined by the processor to the UE.

Figure 24:
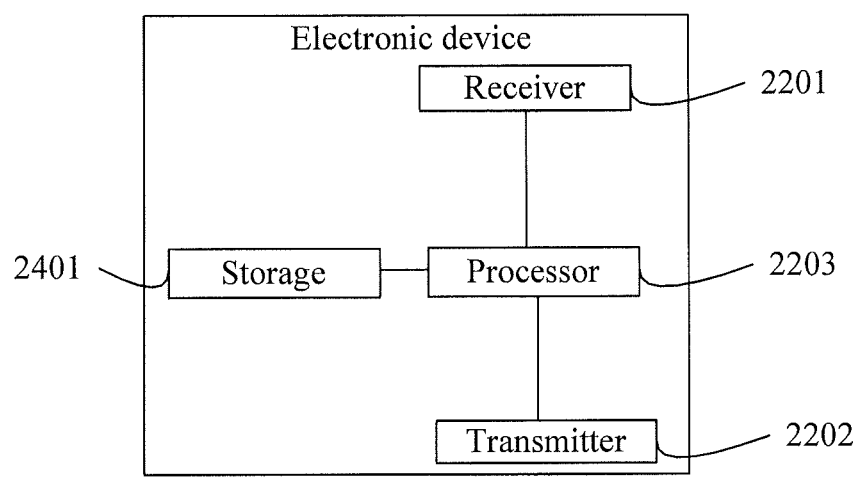
FIG. 24 is a schematic structural diagram of another electronic device according to an embodiment of the present invention.

An embodiment of the present invention provides another electronic device. This embodiment is similar to the embodiment shown in FIG. 22. As shown in FIG. 24, a difference lies in that the electronic device further includes:

a storage 2401, configured to store the MPD file generated by the processor 2203 and the DASH streaming media data converted by the processor 2203.

The processor 2203 is further configured to determine, according to the found bit rate representation, the DASH streaming media data that is corresponding to the UE and stored by the storage 2401.

The transmitter 2202 is further configured to send the DASH streaming media data determined by the processor 2203 to the UE.

An embodiment of the present invention provides another electronic device. This embodiment further describes the embodiment shown in FIG. 22, where the receiver 2201 is further configured to receive a same data request;

the transmitter 2202 is further configured to send the MPD file to the UE when the receiver 2201 receives the same data request;

the processor 2203 is further configured to determine, according to a DASH streaming media data request indication that is received by the receiver 2201 and matches a current channel condition of the UE, the DASH streaming media data corresponding to the UE in the storage 2401; and the transmitter 2202 is further configured to send the DASH streaming media data determined by the processor 2203 to the UE.

A problem that when a streaming media server does not support a DASH technology, the streaming media server cannot acquire DASH streaming media data that matches a bit rate in an MPD file due to a failure of parsing the MPD file can be avoided by using the apparatus provided in this embodiment of the present invention, so that the streaming media server directly receives the DASH streaming media data after sending a data request, and when the streaming media server does not support the DASH technology, the DASH technology can be implemented between the streaming media server and the UE.

In the several embodiments provided in the present application, it should be understood that the disclosed apparatus is configured to implement the method. For example, the described apparatus embodiments are merely exemplary. For example, the division of the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces.

The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

It may be clearly understood by a person skilled in the art that, for the purpose of convenient and brief description, division of the foregoing function modules is taken as an example for illustration, in actual implementation, the foregoing functions can be allocated to different modules and implemented according to the need, that is, inner structure of the apparatus is divided into different function modules to implement all or part of the functions described above. For a detailed working process of the foregoing system, apparatus and unit, reference may be made to the corresponding process in the method embodiments, and details will not be described herein again.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting streaming media data, comprising:

receiving a data request sent by a user equipment (UE), wherein the data request is used to request a media presentation description (MPD) file from a streaming media server;

when the UE does not support a dynamic adaptive steaming over the Hypertext Transfer Protocol HTTP (DASH) technology, forwarding the data request to the streaming media server, and receiving the requested MPD file that is delivered by the streaming media server according to the data request;

selecting, in the MPD file, a bit rate representation that matches a rate at which DASH streaming media data is transmitted;

determining the DASH streaming media data according to the selected bit rate representation;

sending a DASH streaming media data request corresponding to the DASH streaming media data to the streaming media server;
receiving the DASH streaming media data that is sent by the streaming media server according to the DASH streaming media data request; and
sending the DASH streaming media data to the UE.

2. The method according to claim 1, further comprising:
determining, according to the data request, whether the UE supports the DASH technology over HTTP.

3. The method according to claim 2, wherein the determining whether the UE supports the DASH technology over HTTP comprises:
acquiring DASH capability information of the UE from a mobility management control entity when a bearer is established or modified, and learning, according to the DASH capability information, whether the UE supports the DASH technology over HTTP; or
acquiring DASH capability information of the UE from the data request, and learning, according to the DASH capability information, whether the UE supports the DASH technology over HTTP.

4. The method according to claim 1, after the sending the DASH streaming media data to the UE, further comprising:
storing the MPD file and the DASH streaming media data;
when a same data request is received, searching for, according to the MPD file, the bit rate representation that matches the rate at which the DASH streaming media data is transmitted;
determining the DASH streaming media data according to the found bit rate representation; and
sending the DASH streaming media data to the UE.

5. A method for transmitting streaming media data, comprising:
receiving a data request sent by a user equipment (UE), wherein the data request is used to request streaming media data from a streaming media server;
sending the data request to the streaming media server when the streaming media server does not support a dynamic adaptive steaming over the Hypertext Transfer Protocol HTTP (DASH) technology;
receiving the requested streaming media data sent by the streaming media server;
converting the streaming media data into DASH streaming media data, and generating a media presentation description (MPD) file; and
selecting, in the MPD file, a bit rate representation that matches a rate at which DASH streaming media data is transmitted;
determining the DASH streaming media data according to the selected bit rate representation;
sending a DASH streaming media data request corresponding to the DASH streaming media data to the streaming media server;
receiving the DASH streaming media data that is sent by the streaming media server according to the DASH streaming media data request; and
sending the DASH streaming media data to the UE.

6. The method according to claim 5, comprising:
determining, according to the data request, whether the streaming media server supports the DASH technology over HTTP.

7. The method according to claim 6, wherein the determining whether the streaming media server supports the DASH technology over HTTP comprises:
acquiring DASH capability information of the streaming media server, and learning, according to the DASH capability information, whether the streaming media server supports the DASH technology over HTTP.

8. The method according to claim 5, after the sending the DASH streaming media data to the UE, further comprising:
storing the MPD file and the DASH streaming media data;
determining, according to the found bit rate representation, the DASH streaming media data corresponding to the UE; and
sending the DASH streaming media data to the UE.

9. The method according to claim 5, after sending the MPD file to the UE, further comprising:
when a same data request is received, sending the MPD file to the UE, determining, according to a received DASH streaming media data request indication that matches a current channel condition of the UE, the DASH streaming media data corresponding to the UE, and sending the DASH streaming media data to the UE.

10. An electronic device, comprising:
a receiver, configured to receive a data request sent by a user equipment (UE), wherein the data request is used to request a media presentation description (MPD) file from a streaming media server;
a transmitter, configured to forward, when the UE does not support a dynamic adaptive steaming over the Hypertext Transfer Protocol HTTP (DASH) technology, the data request received by the receiver to the streaming media server; wherein
the receiver is configured to receive the requested MPD file that is delivered by the streaming media server according to the data request sent by the transmitter; and
a processor, configured to select, in the MPD file, a bit rate representation that matches a rate at which DASH streaming media data is transmitted, and determine the DASH streaming media data according to the selected bit rate representation,
the transmitter is configured to send a DASH streaming media data request corresponding to the DASH streaming media data to the streaming media server;
the receiver is configured to receive the DASH streaming media data that is sent by the streaming media server according to the DASH streaming media data request, and
the transmitter is configured to send the DASH streaming media data to the UE.

11. The electronic device according to claim 10, wherein the processor is further configured to determine, according to the data request received by the receiver, whether the UE supports the DASH technology over HTTP.

12. The electronic device according to claim 11, wherein the processor is further configured to:
acquire DASH capability information of the UE from a mobility management control entity when a bearer is established or modified, and learn, according to the DASH capability information, whether the UE supports the DASH technology over HTTP; or
acquire DASH capability information of the UE from the data request, and learn, according to the DASH capability information, whether the UE supports the DASH technology over HTTP.

13. The electronic device according claim 10, further comprising:
a storage, configured to store the MPD file received by the receiver and the DASH streaming media data acquired by the processor.

14. An electronic device, comprising:
a receiver, configured to receive a data request sent by a user equipment (UE), wherein the data request is used to send a data request to a streaming media server;
a transmitter, configured to send the data request received by the receiver to the streaming media server when the streaming media server does not support a dynamic adaptive steaming over the Hypertext Transfer Protocol HTTP (DASH) technology; wherein
the receiver is further configured to receive, after the transmitter sends the data request, the requested streaming media data sent by the streaming media server; and
a processor, configured to convert the streaming media data received by the receiver into DASH streaming media data and generate a media presentation description (MPD) file; wherein:
the processor is configured to select, in the MPD file, a bit rate representation that matches a rate at which DASH streaming media data is transmitted, and determine the DASH streaming media data according to the selected bit rate representation
the transmitter is configured to send a DASH streaming media data request corresponding to the DASH streaming media data to the streaming media server;
the receiver is configured to receive the DASH streaming media data that is sent by the streaming media server according to the DASH streaming media data request, and
and
the transmitter is configured to send the DASH streaming media data that is corresponding to the UE and selected by the processor to the UE.

15. The electronic device according to claim 14, wherein the processor is further configured to: determine, according to the data request received by the receiver, whether the streaming media server supports the DASH technology over HTTP.

16. The electronic device according to claim 15, wherein the processor is specifically configured to acquire DASH capability information of the streaming media server, and learn, according to the DASH capability information, whether the streaming media server supports the DASH technology over HTTP.

17. The electronic device according to claim 14, wherein:
the processor is specifically configured to: search for, in the MPD file, a bit rate representation that matches the rate at which the DASH streaming media data is transmitted, and determine, according to the found bit rate representation, the DASH streaming media data corresponding to the UE; and
the transmitter is further configured to send the DASH streaming media data determined by the processor to the UE.

18. The electronic device according to claim 14, further comprising:
a storage, configured to store the MPD file generated by the processor and the DASH streaming media data converted by the processor.

* * * * *

UNITED STATES PATENT AND TRADEMARK OFFICE
CERTIFICATE OF CORRECTION

| | |
|---|---|
| PATENT NO. | : 10,182,086 B2 |
| APPLICATION NO. | : 14/817599 |
| DATED | : January 15, 2019 |
| INVENTOR(S) | : Chunshan Xiong et al. |

Page 1 of 1

It is certified that error appears in the above-identified patent and that said Letters Patent is hereby corrected as shown below:

In the Claims

Column 32, Line 36, In Claim 10, delete "representation," and insert -- representation; --, therefor.

Column 33, Line 22, In Claim 14, delete "representation" and insert -- representation; --, therefor.

Signed and Sealed this
Eighth Day of October, 2019

Andrei Iancu
*Director of the United States Patent and Trademark Office*